(12) United States Patent
Yano et al.

(10) Patent No.: US 6,393,361 B1
(45) Date of Patent: *May 21, 2002

(54) DANGEROUS APPROACH PREVENTION DEVICE FOR VEHICLE

(75) Inventors: Takuto Yano; Minoru Nishida, both of Tokyo (JP)

(73) Assignee: Mitsubishi Denki Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/435,025

(22) Filed: Nov. 5, 1999

(30) Foreign Application Priority Data

May 18, 1999 (JP) .......................... 11-137703

(51) Int. Cl.[7] ............................... B60T 7/12
(52) U.S. Cl. .................... 701/301; 701/95; 340/436
(58) Field of Search ................... 701/301, 96; 340/436, 340/903, 435; 382/106, 107; 348/77

(56) References Cited

U.S. PATENT DOCUMENTS

| 5,432,509 A | * | 7/1995 | Kajiwara ................. 340/903 |
| 5,521,580 A | * | 5/1996 | Kaneko et al. ............ 340/439 |
| 5,572,428 A | * | 11/1996 | Ishida et al. ............. 701/301 |
| 5,629,669 A | * | 5/1997 | Asano et al. ............. 340/436 |
| 5,642,093 A | * | 6/1997 | Kinoshita et al. .......... 340/439 |
| 5,745,031 A | * | 4/1998 | Yamamoto ................. 340/439 |
| 5,801,763 A | * | 9/1998 | Suzuki .................... 348/77 |
| 5,815,070 A | * | 9/1998 | Yoshikawa ................. 340/439 |
| 6,131,063 A | * | 10/2000 | Seki et al. ............... 701/70 |

FOREIGN PATENT DOCUMENTS

| JP | 60-38238 | 2/1985 | ............. B60T/7/12 |
| JP | 5-42862 | 2/1993 | ............. B60T/7/12 |

* cited by examiner

Primary Examiner—Tan Nguyen
(74) Attorney, Agent, or Firm—Sughrue Mion, PLLC

(57) ABSTRACT

The present invention is to enhance safety of a vehicle by avoiding excessive approaches and collisions with preceding vehicles without spoiling a drive feeling of a driver by controlling the vehicle by, for example, initializing CPU and RAM in Step 201, operating a velocity and an acceleration of an own vehicle, following-on ranges from the preceding vehicles, relative velocities, a variable amount of steering angle, the amount of stepping brake from various sensor outputs in Step 202, judging an unconsciousness such as dozing from the variable amount of the steering angle in Step 203, obtaining an approach index expressing degrees of approaching to the preceding vehicles in Step 205, operating a target braking force by the amount of stepping brake pedal and controlled variables corresponding to the approach index based on the following-on ranges or the like when the driver is judged to be dozing in a case of excessively approaching in Step 205, and controlling the own vehicle by outputting these results of operation, wherein a braking force corresponding to an ordinary amount of stepping brake is applied when the driver is not unconscious and the vehicle does not excessively approach to the preceding vehicles.

20 Claims, 24 Drawing Sheets

F I G. 23
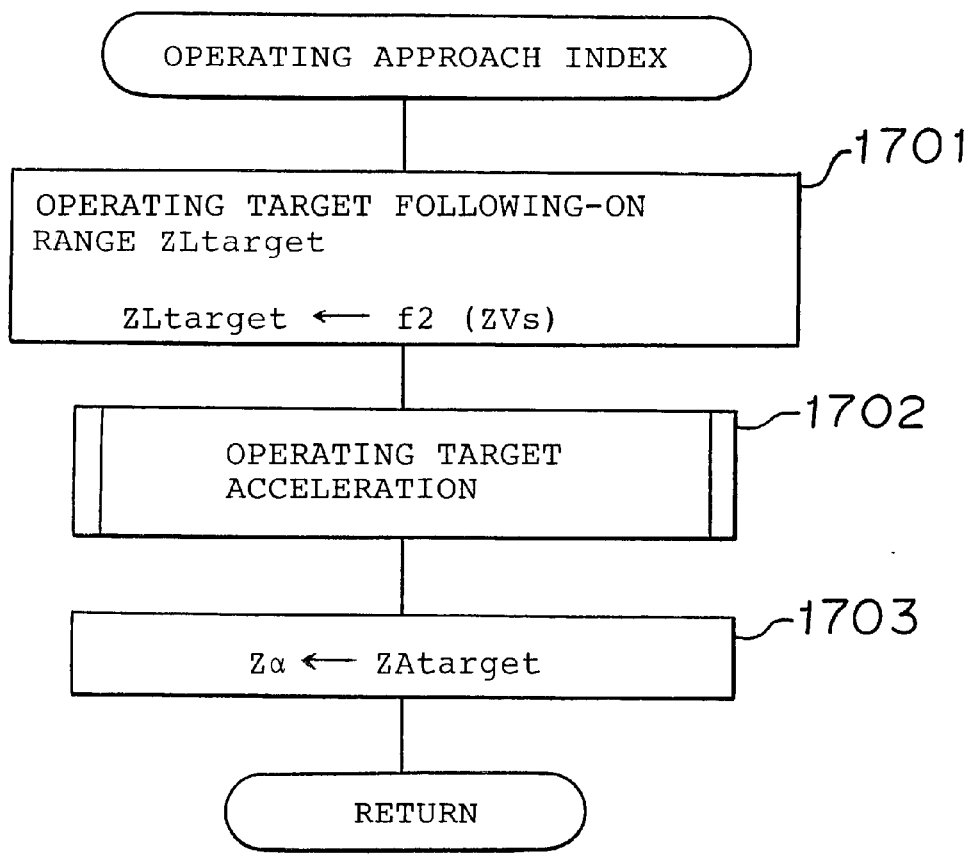

DANGEROUS APPROACH PREVENTION DEVICE FOR VEHICLE

BACKGROUND OF THE INVENTION

1. Field of the Invention

The present invention relates to a dangerous approach prevention device equipped in an own vehicle for preventing dangerous situations caused by approaching preceding vehicles.

Particularly, the present invention relates to a dangerous approach preventing device for preventing excessive approaches to preceding vehicles and collisions therewith by correcting a stopping force by operating a brake pedal after detecting distances from obstacles or preceding vehicles in a heading direction of the own vehicle.

2. Discussion of Background

Conventionally, a control device of detecting distances from obstacles or preceding vehicles in a heading direction and enhancing safety by correcting a braking pressure by a driver's operation of a brake pedal to avoid collisions with the preceding vehicles is known as disclosed in JP-A-60-38238. Such a device is characterized that a right of controlling a braking force, namely priority over an own vehicle, is held by a driver, and operations by the driver are supported.

The conventional device disclosed in JP-A-60-38238 will be described in detail. The device is equipped with a radar apparatus for detecting following-on ranges and relative velocities from obstacles or preceding vehicles in a heading direction of the own vehicle, wherein safe following-on ranges are first operated based on the following-on ranges and the relative velocities when a brake pedal is manipulated. In the next, target acceleration necessary for keeping the safe following-on ranges is obtained based on the following-on ranges and the relative velocities. Simultaneously, actual acceleration of the own vehicle is obtained based on a braking pressure caused by a manipulation of the brake pedal by the driver. As a result of comparison between the target acceleration and the actual acceleration, in case that the actual acceleration does not reach the target acceleration, the braking force is increased for correcting by pressurizing the braking pressure to bring the actual acceleration closer to the target acceleration.

According to the structure, in case that the brake pedal is stepped under a situation that a safe following-on range is not secured, when a sufficiently large braking pressure is indicated by the driver, a braking force based on the braking pressure is generated, and when a sufficiently large braking pressure is not indicated by the driver, the braking pressure is corrected to be pressurized to an appropriate level in order to increase a braking force. In case that the safe following-on range is secured at a time of manipulating the brake by the driver, the braking pressure is not thoughtlessly corrected and a driver's feeling is not unreasonably spoiled. Thus, the own vehicle is always stopped with appropriate acceleration enabling prevention of collisions with preceding vehicles.

However, in the above-mentioned conventional device, the target acceleration of the own vehicle necessary for securing the safe following-on ranges is obtained based on only following-on ranges and relative velocities; and actual acceleration is corrected to bring it into the target acceleration, whereby the driver's feeling does not always match with control of the vehicle. Specifically, when a case that a preceding vehicle is accelerating and a case that a preceding vehicle is decelerating are compared under a situation of same following-on ranges and same relative velocities, a risk of colliding with the preceding vehicle is less in the case that the preceding vehicle is accelerating. Therefore, corrections to same braking forces without consideration of acceleration and deceleration of preceding vehicles do not always satisfy drivers.

Further, in case that a driver intends to approach obstacles or preceding vehicles in a heading direction of an own vehicle or to pass preceding vehicles by changing to neighbor lanes, the conventional device works to correct the braking force of the vehicle to resultantly disturb driving by the driver.

SUMMARY OF THE INVENTION

It is an object of the present invention to solve or reduce the above-mentioned problems inherent in the conventional technique and to provide a dangerous approach prevention device which takes information of not only following-on ranges from obstacles or preceding vehicles in a heading direction of an own vehicle and relative velocities between the preceding vehicles and the own vehicle but also that of acceleration and deceleration of the preceding vehicles in, corrects a braking force of the own vehicle using the amount of correction obtained based on the information, and stops to correct the braking force when the driver intentionally approaches to the preceding vehicles, whereby driver's feeling by the driver is not spoiled, and an excessive approach to the preceding vehicles and collisions with these are avoided for increasing safety.

According to a first aspect of the present invention, there is provided a dangerous approach prevention device for preventing danger caused when an own vehicle approaches to preceding vehicles, comprising: an unconsciousness judging means for detecting a condition that a driver does not consciously drive by dozing-off or the like and judging an unconsciousness in response to the detected condition, and a braking force adjusting means for adjusting a braking force of the own vehicle in response to a degree of approach to the preceding vehicles when the unconscious condition is detected and applying a braking force corresponding to an ordinary amount of stepping a brake pedal.

According to a second aspect of the present invention, there is provided the dangerous approach prevention device according to the first aspect of the present invention, wherein the degree of approach to the preceding vehicles is an approach index representing a level of inducing danger with respect to the preceding vehicles; and the approach index is derived based on selected data among a target following-on range, acceleration of the own vehicle, acceleration of the preceding vehicles, relative velocities, actual following-on ranges, and so on.

According to a third aspect of the present invention, there is provided the dangerous approach prevention device according to the second aspect of the invention, wherein the approach index is a time for colliding with the preceding vehicles, target acceleration of the own vehicle for running with safe following-on ranges from the preceding vehicles, or a result of comparison between the target acceleration of the own vehicle for running with the safe following-on ranges from the preceding vehicles and actual acceleration of the own vehicle.

According to a fourth aspect of the present invention, there is provided the dangerous approach prevention device according to the second or third aspect of the invention, wherein the actual acceleration of the own vehicle is derived from a velocity of the own vehicle or acceleration in response to the amount of stepping the brake pedal.

According to a fifth aspect of the present invention, there is provided the dangerous approach prevention device according to any one of the second through fourth aspects of the invention, wherein the relative velocity is derived from the following-on ranges or detected by a relative velocity sensor.

According to a sixth aspect of the present invention, there is provided the dangerous approach prevention device according to any one of the first through fifth aspects of the invention, wherein, in case that the driver is in an unconsciousness condition, the braking force adjusting means adjusts a braking force in response to a target braking force derived from the degree of approach, in response to the target braking force derived from the amount of stepping the brake pedal and the degree of approach, or by a predetermined target braking force based on the degree of approach.

According to a seventh aspect of the present invention, there is provided the dangerous approach prevention device according to any one of the first through sixth aspects of the invention, wherein the unconsciousness judging means is a dozing detecting means which judges unconsciousness upon detection of dozing-off of the driver, a means for detecting looking-aside which judges the unconsciousness when it is detected that the driver looks aside, a means for detecting driver's intention of changing lanes which detects driver's intentions of changing lanes and judges the unconsciousness in response to these intentions, or a means for judging the unconsciousness using a plurality of these three means arbitrarily selected which judges based on a logical product or a logical sum of the judgements of the unconsciousness.

According to an eighth aspect of the present invention, there is provided the dangerous approach prevention device according to any one of the first through seventh aspects of the invention, further comprising: a consciousness judging means which judges that the driver is not unconscious by detecting driver's intentions of accelerating, wherein the braking force adjusting means controls using an ordinary braking force in response to judgement that the driver is not unconsciousness.

According to a ninth aspect of the present invention, there is provided the dangerous approach prevention device according to the seventh aspect of the invention, wherein the dozing detecting means detects dozing-off of the driver based on a steering angle, a degree of changing the steering angle, or a frequency of changing the steering angle.

According to a tenth aspect of the present invention, there is provided the dangerous approach prevention device according to the seventh aspect of the invention, wherein the dozing detecting means is a means for detecting dozing-off based on directional changes of the own vehicle obtained by a gyro sensor, a means for detecting dozing-off based on lateral acceleration of the own vehicle, or a means for detecting dozing-off based on a lateral position of the own vehicle with respect to a driving lane thereof.

According to an eleventh aspect of the present invention, there is provided the dangerous approach prevention device according to the seventh aspect of the invention, wherein the dozing detecting means or the looking-aside detecting means detects dozing-off of the driver based on an image of a face of the driver shot by a camera.

According to a twelfth aspect of the present invention, there is provided the dangerous approach prevention device according to the seventh aspect of the invention, wherein the dozing detecting means or the lane changing intention detecting means operates radiuses of road or curvature based on shapes of a lane and radiuses of road or curvature of a driving lane of the own vehicle based on a velocity and a steering angle of the own vehicle, and detects dozing-off or lane changing intentions in response to a comparison between results of these operations.

According to a thirteenth aspect of the present invention, there is provided the dangerous approach prevention device according to the seventh aspect of the invention, wherein the lane changing intention detecting means is a means for judging driver's intention of changing lane in response to a steering angle manipulated by the driver, a degree of changing the steering angle, or a frequency of changing the steering angle or a means for judging driver's intention of changing lanes in response to a lateral position of the own vehicle with respect to a lane.

According to a fourteenth aspect of the present invention, there is provided the dangerous approach prevention device according to the seventh aspect of the invention, wherein the lane changing intention detecting means judges that the driver has an intention of changing lanes when a turn indicator light indicates a direction.

According to a fifteenth aspect of the present invention, there is provided the dangerous approach prevention device according to the eighth aspect of the invention, wherein the accelerating intention detecting means is a means for detecting driver's intention of accelerating based on the amount of stepping an accelerator pedal, a degree of change of stepping the accelerator pedal, or a frequency of change of stepping the accelerator pedal or a means for detecting driver's intention of accelerating in response to changes to lower gears in a transmission and the amount of stepping the accelerator pedal.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 23 is a flow chart illustrating an approach index operating process according to Embodiment 9 of the present invention;

DETAILED DESCRIPTION OF THE PREFERRED EMBODIMENTS

A detailed explanation will be given of preferred embodiments of the present invention in reference to FIGS. 1 through 31 as follows, wherein the same numerical references are used for the same or the similar portions and description of these portions is omitted.

Embodiment 1

Figure 1:
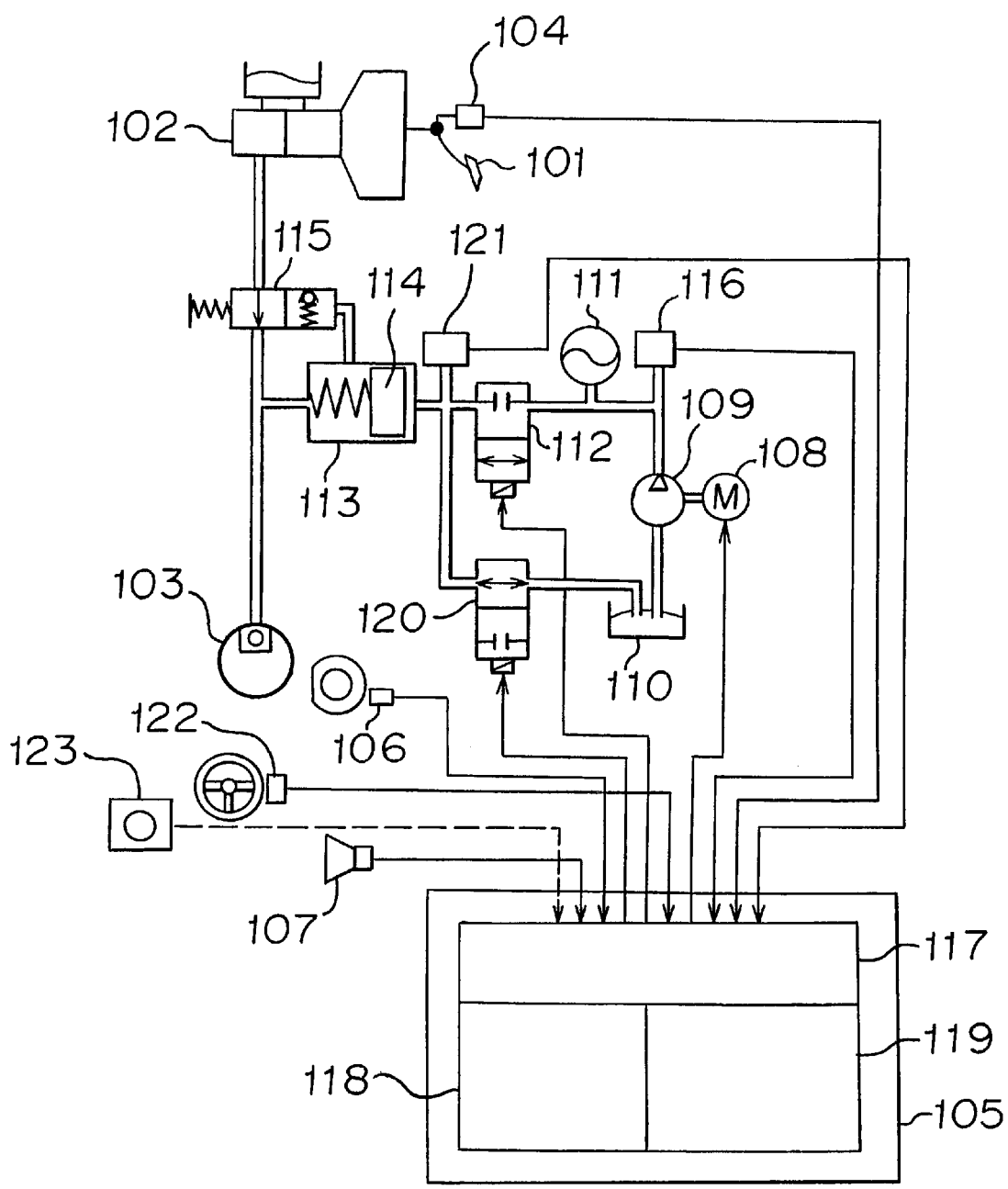
FIG. 1 schematically shows a structure of a system realizing a dangerous approach prevention device according to Embodiment 1 of the present invention.

A schematical structure of dangerous approach prevention device according to Embodiment 1 is illustrated in FIG. 1. In FIG. 1, numerical reference 101 designates a brake pedal; numerical reference 102 designates a master cylinder; numerical reference 103 designates a wheel cylinder; numerical reference 104 designates a sensor for detecting the amount of stepping the brake pedal, which also detects the stepping of the brake pedal; numerical reference 106 designates a velocity sensor; and numerical reference 107 designates a following-on range sensor which detects following-on ranges from obstacles or preceding vehicles in a heading direction of an own vehicle and also lateral ranges from the obstacles or the other vehicles based on conditions of reflections of electric waves or lights.

Numerical reference 110 designates a reservoir tank; numerical reference 111 designates an accumulator for maintaining an oil pressure; numerical reference 109 designates an oil pressure pump for sucking up an oil in the reservoir tank 110 and pressurizing the oil to maintain a high oil pressure in the accumulator 111; numerical reference 108 designates a motor for rotating the oil pressure pump 109; numerical reference 116 designates an accumulator pressure: sensor for detecting an accumulated oil pressure in the accumulator 111; numerical reference 113 designates a cylinder for adjusting an oil pressure applied to the wheel cylinder 103 when the piston 114 provided therein is moved; numerical reference 112 designates an electromagnetic valve by which the piston 114 is moved in the left of FIG. 1 to increase an oil pressure applied to the piston 114 using the accumulator 111 as a source of oil pressure; numerical reference 120 designates an electromagnetic valve by which the piston 114 is moved in the right of FIG. 1 to reduce the oil pressure applied to the piston 114 using the reservoir tank 110 for releasing the oil pressure; and numerical reference 121 designates a piston pressure sensor for detecting the oil pressure applied to the piston 114.

Numerical reference 115 designates a check valve being driven by a movement of the piston 114 to effect an interlock between the wheel cylinder 103 and the master cylinder 102 when the master cylinder 102 has an oil pressure higher than that of the wheel cylinder 103 and to cancel the interlock when the master cylinder 102 has a pressure lower than that of the wheel cylinder 103; and numerical reference 122 designates a steering angle sensor for detecting a steering angle.

Numerical reference 105 designates a control unit for controlling the motor 108, and the electromagnetic valves 112, 120 based on information from the above-mentioned sensors, which is composed of a central processing unit 119, a memory unit 118, an input/output interface 117 and so on, generally fabricating well-known microcomputers.

Operations of thus constructed dangerous approach prevention device will be briefly described. The amount of stepping the brake is detected by the sensor for detecting amount of stepping brake pedal 104 and transmitted to the control unit 105. The oil pressure of the accumulator 111 is detected by the pressure sensor 116 and transmitted to the control unit 105. Following-on ranges and lateral ranges from obstacles or preceding vehicles in a heading direction of an own vehicle is detected by the following-on range sensor 107 and transmitted to the control unit 105.

Under a situation that the control unit 105 judges that a sufficiently safe following-on range from a forward obstacle or a preceding vehicle based on a detected following-on range or the like, when a driver steps the brake pedal 101, the master cylinder 102 is operated in response to the step upon the brake pedal 101; the oil pressure of the wheel cylinder 103 is increased; and a braking force corresponding to the oil pressure is generated in a similar manner to ordinary vehicles.

Under a situation that the driver is unconscious by dozing driving and a safe following-on range is not kept from a forward obstacle or a preceding vehicle, the master cylinder 102 is operated in response to stepping of the brake pedal 101, whereby the oil pressure of the wheel cylinder is increased.

By actuating the pressurizing electromagnetic valve 112 by a controlled variable in response to an approach index based on the following-on range and so on, the piston 113 is moved in the left of FIG. 1 to disconnect an interlock between the master cylinder 102 and the wheel cylinder 103 by the check valve 115. After the movement of the piston 114, the oil pressure in the wheel cylinder 103, generated by stepping the brake pedal 101, is further increased, whereby a braking force corresponding to thus increased oil pressure being larger than an ordinary force is generated.

Under a situation that the own vehicle is in a transition from an unsafe situation to a safe situation with respect to a preceding vehicle, the depressurizing electromagnetic valve 120 is driven by a controlled variable corresponding to an approach index based on a following-on range and so on to resultantly move the piston 113 in the right of FIG. 1. As a result, the oil pressure in the wheel cylinder, 103 is decreased to reduce the braking force. Incidentally, when the oil pressure in the accumulator 111 is decreased, such a decrement is detected by the pressure sensor 116 and the motor 108 is rotated to successively maintain the oil pressure in the accumulator 111 to be large.

In the next, a flow of a program memorized in the memory unit 118 in the control unit 105 and processed by the central processing unit 119 will be described.

Figure 2:
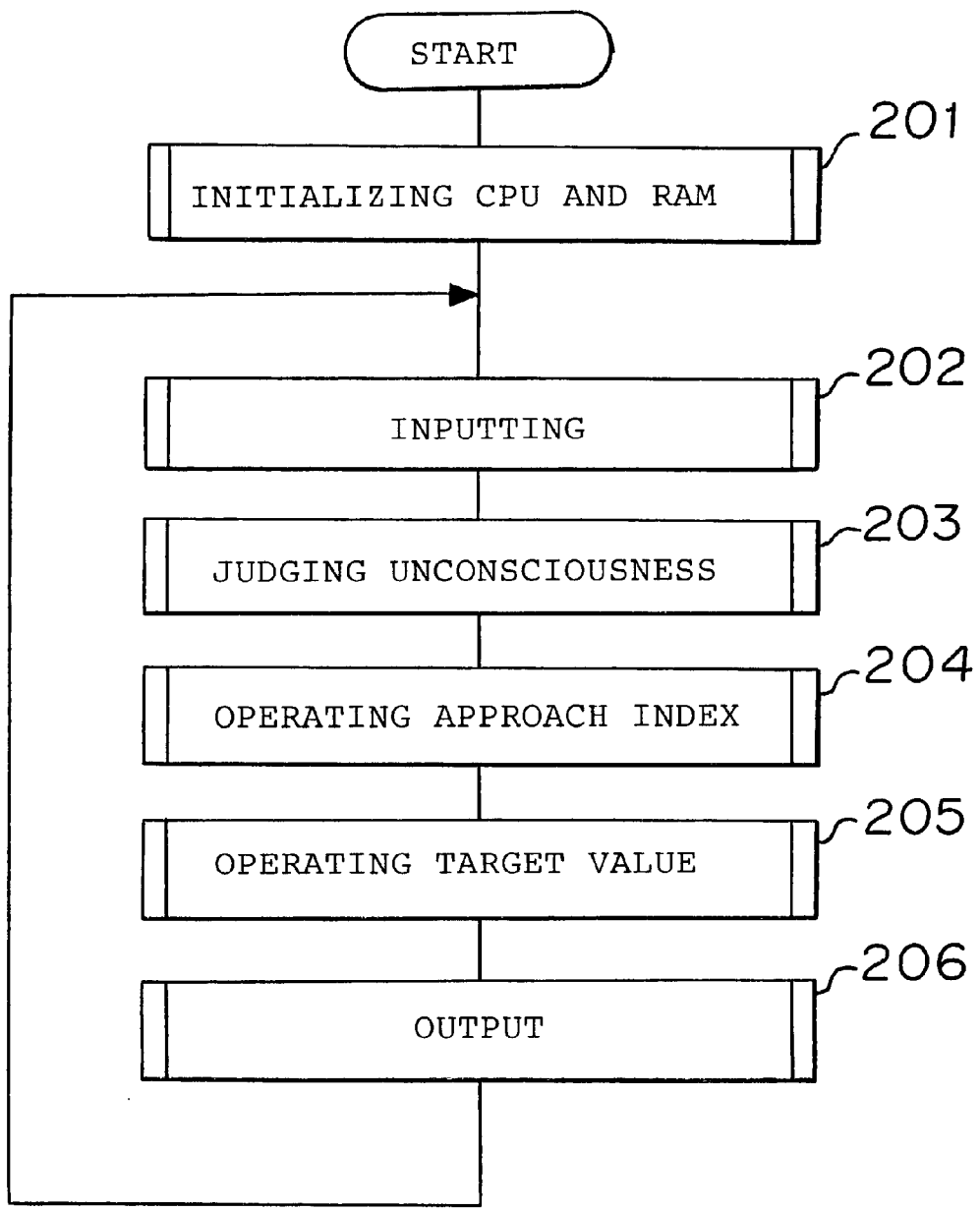
FIG. 2 is a flow chart illustrating a main routine of a program according to Embodiment 1 of the present invention.

FIG. 2 is a flow chart illustrating a main routine of the program, wherein the main routine is repeatedly executed by, for example, 20 ms.

References ZVs, Zbrake, ZL, ZLv, ZVr, ZAp, ZAs, Zstr, Zstr_o, Zdstr, Ztimer1, ZD, Zt, Zt1, Zt2, Zα, Zpacc, Zppiston, Zptarget, Ysleep, and Ycons are variables or flags, by which results of operation can be temporarily memorized in the memory unit 118 and which can be randomly read out. References Xdstr, Xsample, Xtmax, Xα, Xbrake, and Xtime1 are previously memorized in the memory unit 118 and readable.

(1) In Step 201, values of the variables are initialized.

Figure 3:
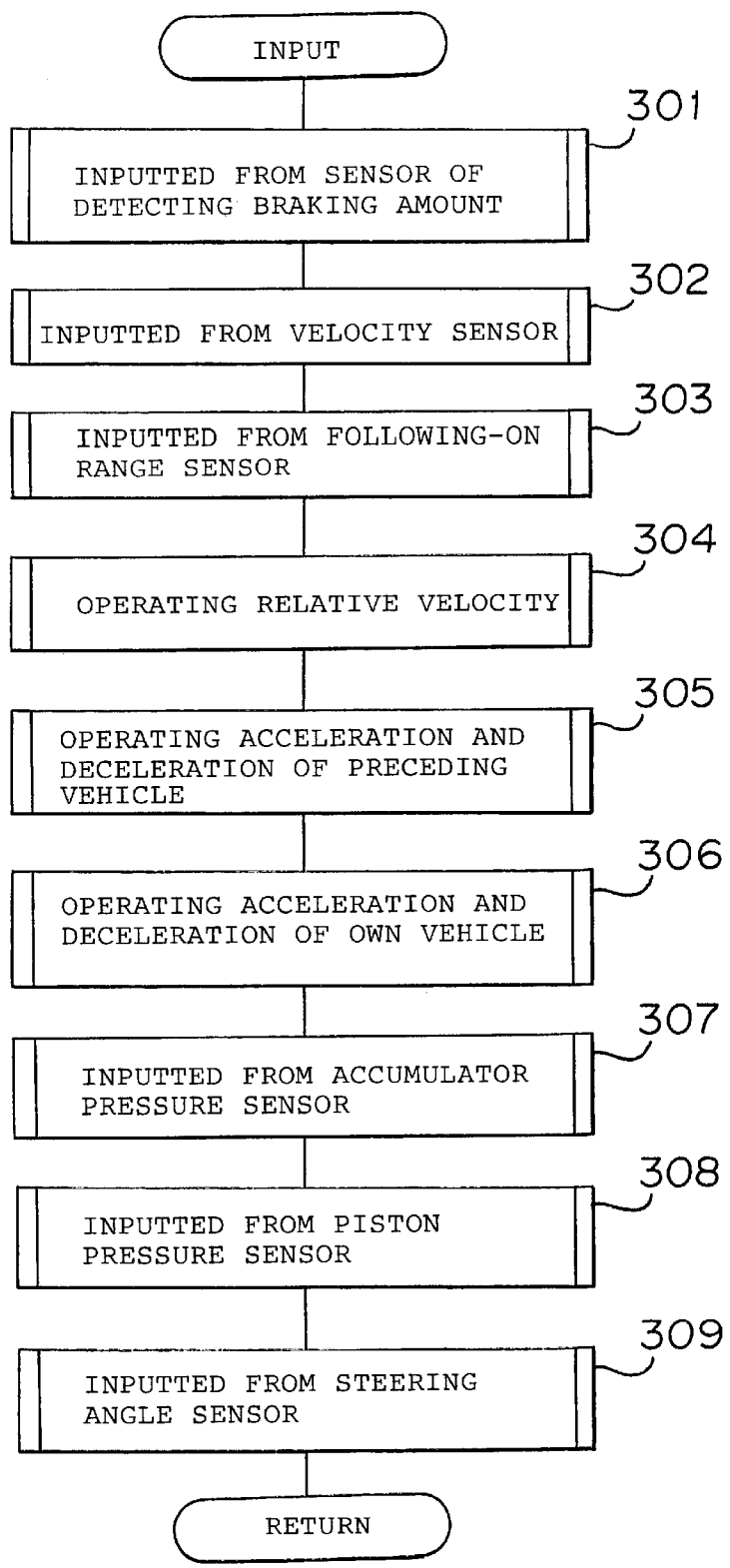
FIG. 3 is a flow chart illustrating an input process according to Embodiment 1 of the present invention.

(2) In Step 202, conditions of sensors and switches connected to the control unit 105 are inputted like an input process illustrated in FIG. 3.

(3) In Step 301, a signal from the sensor for detecting amount of stepping brake. 104 is inputted and memorized as the amount Zbrake of stepping the brake pedal 101.

(4) In Step 302, a vehicle velocity signal outputted from the vehicle velocity sensor 106 is inputted and memorized as the own vehicle velocity ZVs.

(5) In Step 303, a signal from the following-on range sensor 107 is inputted and memorized as a following-on range ZL and a lateral range ZLv from an obstacle or a preceding vehicle in a heading direction of the own vehicle.

(6) In Step 304, the following-on range ZL is once differentiated. Specifically, a range between a previous value and a current value of the following-on range is divided by a period of the main routine, e.g. 20 ms, and the obtained is memorized as a relative velocity ZVr with respect to the preceding vehicle. This relative velocity may be subjected to smoothing (hereinbelow, referred to as filtering) using values of the current time, the previous time, and times before the previous time.

(7) In Step 305, an added value of the relative velocity ZVr and the own vehicle velocity ZVs, i.e. a velocity of the preceding vehicle, is once differentiated, and thus added value is memorized as an accelerating and decelerating rate ZAp. Incidentally, this accelerating and decelerating rate ZAp may be similarly subjected to filtering.

(8) In Step 306, a value obtained by once differentiating the own vehicle velocity ZVs is memorized as an accelerating and decelerating rate of the own vehicle ZAs. Incidentally such an accelerating and decelerating rate ZAs of the own vehicle may be similarly subjected to filtering.

(9) In Step 307, a signal from the accumulator pressure sensor 116 is inputted and memorized as the accumulator pressure Zpacc.

(10) In Step 308, a signal from the piston pressure sensor 121 is inputted and memorized as a piston pressure Zppiston.

(11) In Step 309, a signal from the steering angle sensor 122 is inputted and memorized as a steering angle Zstr.

(12) After completing processes of Steps 310 through 309, Step 203 illustrated in FIG. 2 is selected.

Figure 5:
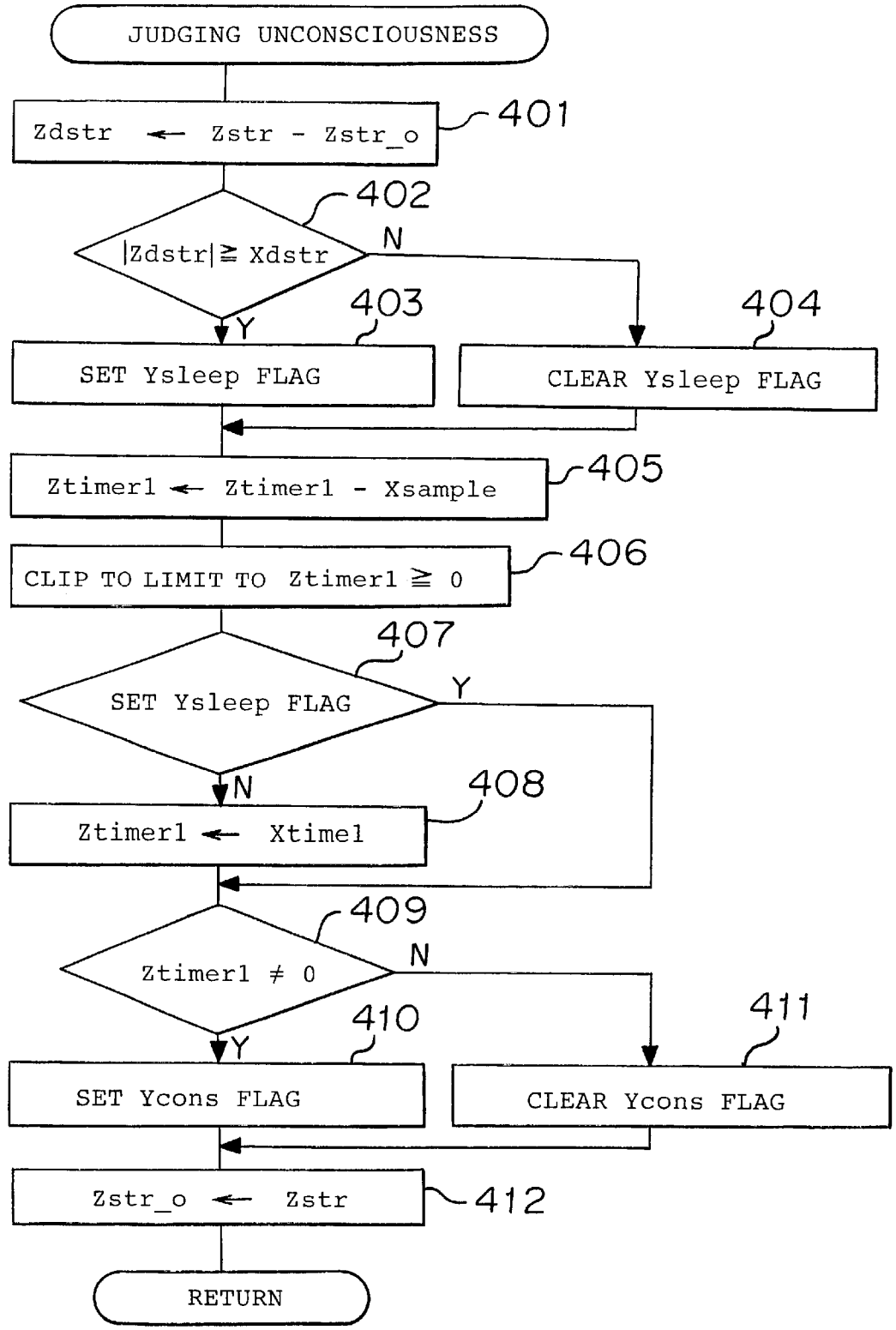
FIG. 5 is a flow chart illustrating the unconsciousness judging process according to Embodiment 1 of the present invention.
Figure 6:
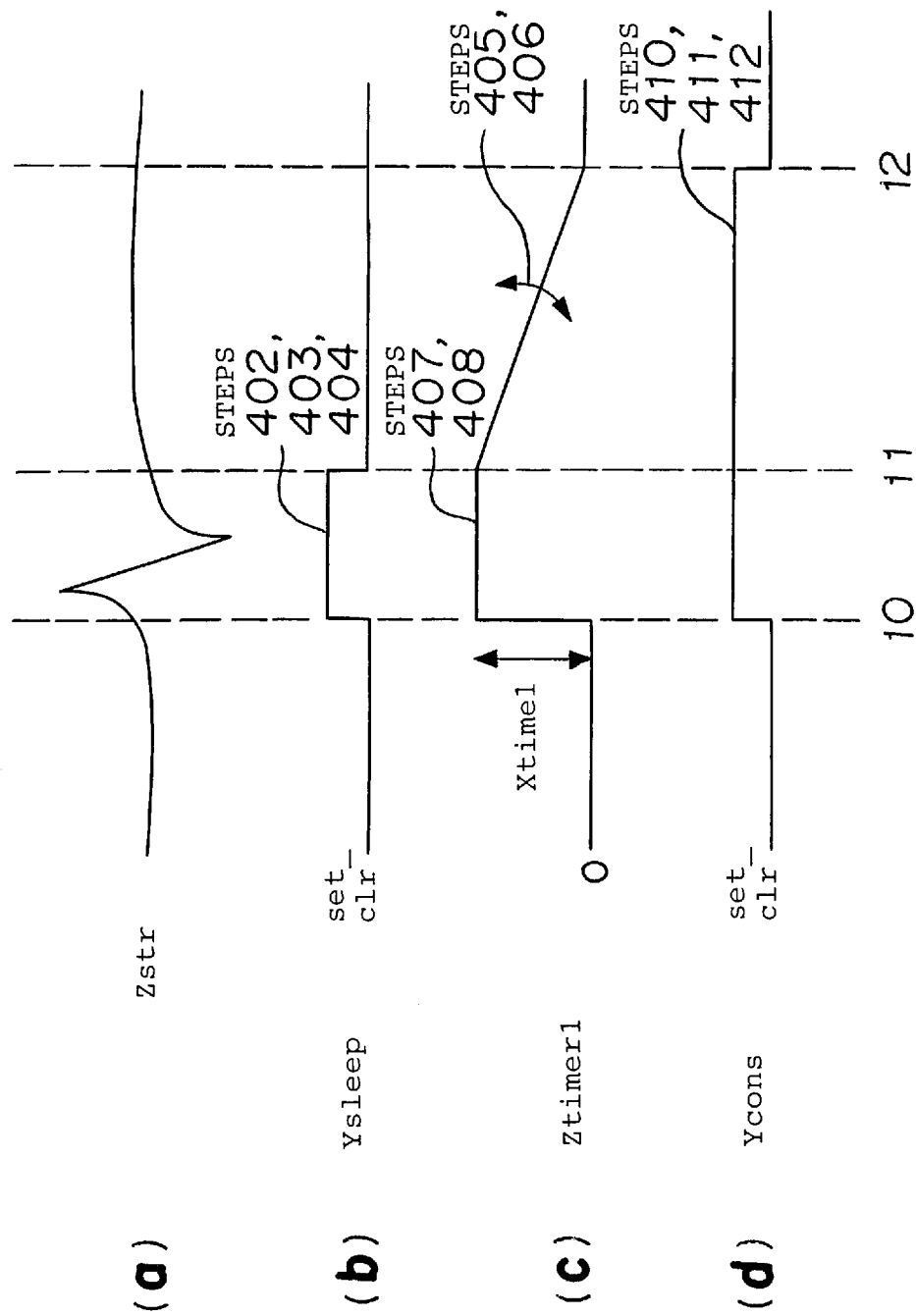
FIG. 6 is a time chart of the unconsciousness judging process according to Embodiment 1 of the present invention.

In the next, an unconsciousness judging process illustrated in Step 203 of FIG. 2 will be described. FIG. 5 is a flow chart of a program executing the unconsciousness judging process; and FIG. 6 is a time chart of the unconsciousness judging process.

In operations of the process illustrated in FIG. 5, in case that a degree of change of the steering angle within a predetermined time is a predetermined value or more, it is judged that a driver is in a condition of dozing driving and the driver is unconscious for a predetermined period after the predetermined time. An idea of detecting the situation of dozing driving will be described.

In an initial stage of dozing driving before a driver is fast asleep, namely in a condition that awakening is quite insufficient, an own vehicle laterally deviates a little by dozing for a very short time and corrects this deviation by abrupt steering at each instance of awaking, and such is repeated. Now, the flow chart of the unconsciousness judging process illustrated in FIG. 5 based on this idea will be explained.

(1) In Step 401, a difference between a currently inputted steering angle Zstr and a previously inputted steering angle Zstr_o obtained in Step 412 is memorized as a degree of change of steering angle Zdstr.

(2) In Step 402, it is judged whether or not an absolute value of the degree of change of steering angle Zdstr is a predetermined value Xdstr or more, in other words whether or not |Zdstr|≧Xdstr.

(3) When |Zzdstr|≧Xdstr, Step 403 is selected to set a flag Ysleep by judging that the driver is dozing.

(4) When |Zdstr|≧Xdstr is not established, Step 404 is selected to clear the flag Ysleep.

(5) In Step 405, a timer Ztimer1 for judging whether or not the dozing condition is continued is counted down by a sampling time Xsample, i.e. in Embodiment 1, a period of operating the program. Thereafter, the timer Ztimer1 is newly memorized.

(6) In Step 406, the timer Ztimer1 is limited to values of 0 or more.

(7) In Step 407, it is judged whether or not the flag Ysleep is set.

(8) When the flag Ysleep is set, Step 408 is selected to set the timer Ztimer1 to be Xtime1 being a positive constant, where an initial value of the timer Ztimer1 is 0.

(9) In Step 409, it is judged whether or not the timer Ztimer1≠0. When Ztimer1≠0, Step 410 is selected to set a flag Ycons by judging that the driver is dozing, namely the driver is unconscious of the front of the own vehicle.

(10) When Ztimer1≠0 is not established, Step 411 is selected to clear the flag Ycons by judging that the driver is not dozing, namely not in unconsciousness.

(11) In Step 412, the currently inputted steering angle Zstr is memorized as the previously inputted steering angle Zstr_o for a next process of this routine.

(12) After processing Steps 401 through 412, Step 204 illustrated in FIG. 2 is selected.

A flow of processes will be described in reference of a time chart illustrated in FIG. 6. As in a line (a), when a change of the steering angle becomes a predetermined value or more, larger than an angle by normal steering manipulations, such a point 10 is made to be a trigger and a dozing condition is judged between the point 10 and a point 11 having the change smaller than the predetermined value as in a line (b). Further, a dozing condition is judged between the point 11 and a point 12 for a predetermined period, i.e. a counted time by a timer of a hatched portion in a line (c), even though the steering angle is returned within a normal range, which dozing situation is indicated by a line (d) of FIG. 6.

In other words, the dozing situation is set for a period of an abnormal condition of the steering angle and the predetermined period thereafter.

In the next, a process of operating the approach index described in Step 204 of FIG. 2 will be described.

Figure 7:
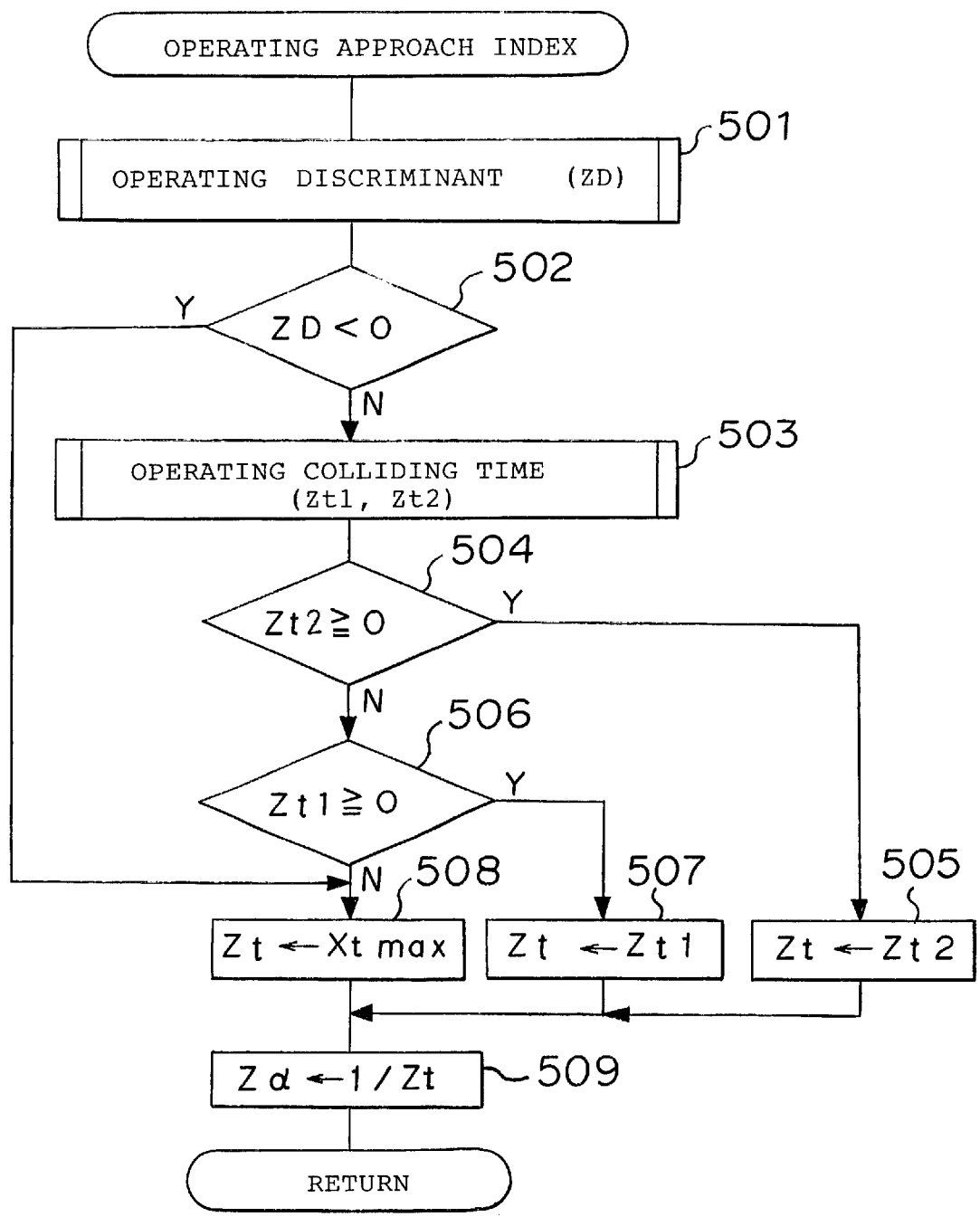
FIG. 7 is a flow chart illustrating an approach index operating process according to Embodiment 1 of the present invention.

FIG. 7 is a flow chart of a program for processing operations of the approach index, which is a process routine for operating a time of colliding with a preceding vehicle. A method of operating the time for colliding with the preceding vehicle will be described in use of numerical Equations. Provided that an own vehicle pursues the preceding vehicle with a following-on range ZL (m), and absolute position Sp of the preceding vehicle after passing t seconds is represented by Equation 1 based on a position of the own vehicle at a starting point of t seconds.

$$Sp = ZVp \cdot t + (ZAp \cdot t^2/2) + ZL\,(m) \qquad \text{Equation 1}$$

where $t \geq 0$;

reference ZVp represents a velocity of the preceding vehicle (m/s); and reference ZAp represents an accelerating degree of the preceding vehicle (M/s$^2$).

Similarly, an absolute position Ss of the own vehicle after the above-mentioned t seconds is expressed by Equation 2.

$$Ss = ZVs \cdot t + ZAs \cdot t^2/2\,(m) \qquad \text{Equation 2}$$

where $t \geq 0$;

reference ZVs represents a velocity of the own vehicle (m/s); and reference ZAs represents an accelerating degree of the own vehicle (m/s$^2$).

In case that the own vehicle collides with the preceding vehicle, Equation 3 is established.

$$Sp - Ss = 0 \qquad \text{Equation 3}$$

In rearranging Equation 3 by substituting Equations 1 and 2 thereinto, Equation 4 is obtained.

$$[(ZAp-ZAs)/2]t_2 + (ZVp-ZVs)\cdot t + ZL = 0$$

$$[(ZAp-ZAs)/2]\cdot t^2 + ZVr\cdot t + ZL = 0 \qquad \text{Equation 4}$$

where reference ZVr represents a relative velocity (m/s); and $ZVr = ZVp - ZVs$.

When Equation 4 is solved to obtain t.

$$t = \{-ZVr \pm [ZVr^2 - 2\cdot(ZAp\cdot ZAs)\cdot ZL]^{1/2}\}/(ZAp-ZAs) \qquad \text{Equation 5}$$

Equation 6 where, $t \geq 0$ $$\text{Discriminant } ZD = ZVr^2 - 2\cdot(ZAp\cdot ZAs)\cdot ZL \geq 0 \qquad \text{Equation 7}$$

Provided that a couple of values of t are respectively Zt1 and Zt2, where Zt1 ≥ Zt2, one of Zt1 and Zt2 equal to 0 or larger and smaller than the other represents a time Zt for colliding with the preceding vehicle. In case that t satisfying conditions of Equations 6 and 7, the own vehicle does not collide with the preceding vehicle.

In the next, the above-mentioned approach index operating process will be described in reference of the flow chart illustrated in FIG. 7.

(1) In Step 501, the discriminate ZD of Equation 7 is operated.

(2) In Step 502, it is judged whether or not ZD<0.

(3) When ZD<0, Step 508 is selected to substitute Xtmax into the time Zt for colliding. Thereafter, Step 509 is selected. Reference Xtmax is a value representing a situation that the own vehicle does not collide with the preceding vehicle, which should theoretically be an infinite numerical value but practically determined to be, for example, a maximum value of data of 16 bits of binary number.

(4) When ZD≥0, Step 503 is selected to operate the couple of solutions of Equation 5, namely Zt1 and Zt2, where Zt1 ≥ Zt2.

(5) Steps 504 and 506 are discriminating blocks for selecting one of Zt1 and Zt2 being equal to or larger than 0 and simultaneously smaller than the other. In other words, in Step 504, it is judged whether or not Zt2≥0.

(6) When Zt2≥0, Step 505 is selected to substitute Zt2 into the time Zt for colliding. Thereafter, Step 509 is selected.

(7) When Zt2≥0 is not established, Step 506 is selected to judge whether or not Zt1≥0.

(8) Zt1≥0, Step 507 is selected to substitute Zt1 into the time Zt for colliding. Thereafter, Step 509 is selected.

(9) When Zt1≥0 is not established, Step 508 is selected to substitute Xtmax into Zt. Thereafter, Step 509 is selected.

(10) In Step 509, a reciprocal of the time Zt for colliding with the preceding vehicle is substituted into Zα as the approach index. As a result, as a risk of colliding with the preceding vehicle is low, the approach index Zα takes a small value.

(11) After completing processes of Steps 501 through 509, Step 205 in FIG. 2 is selected.

Figure 8:
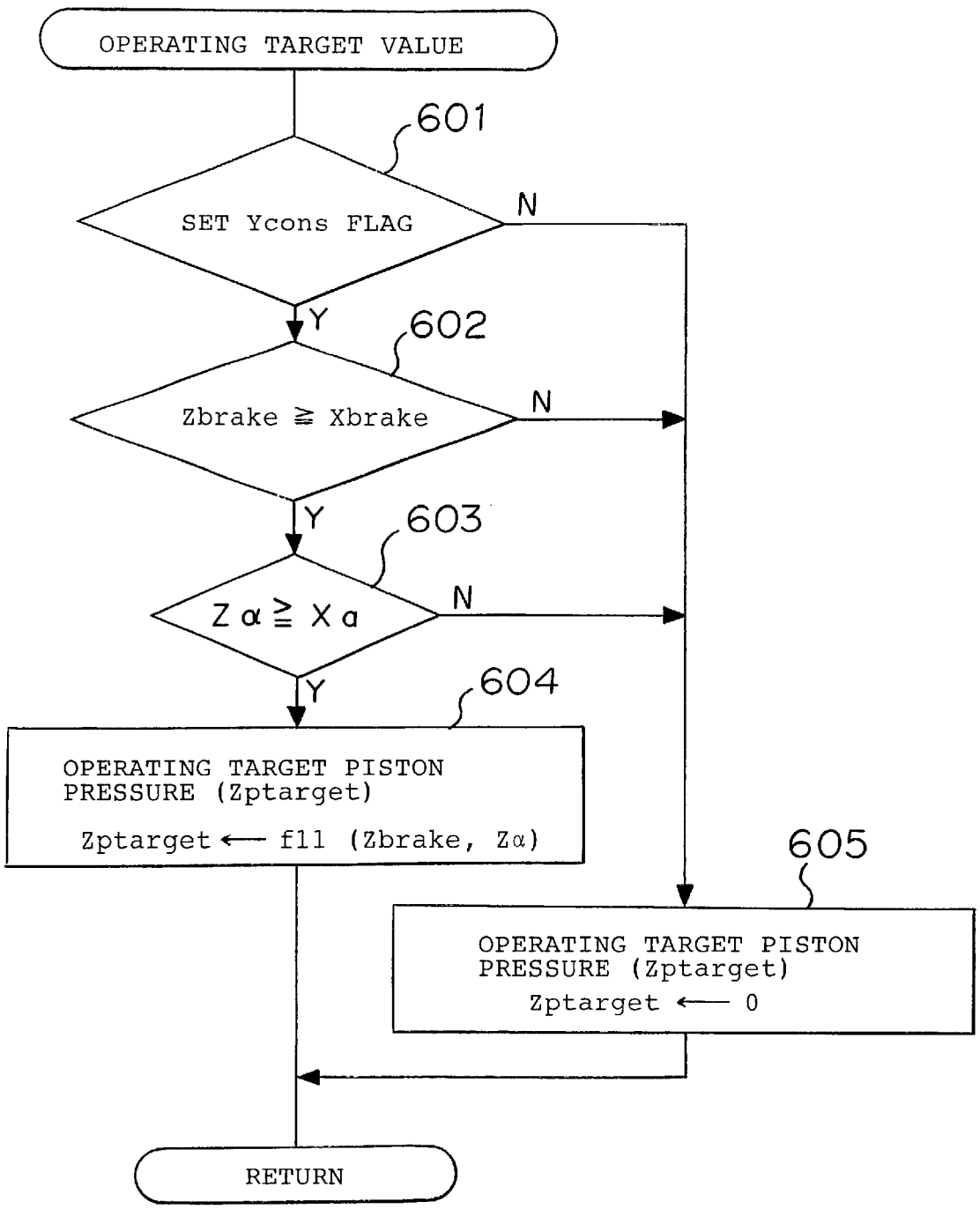
FIG. 8 is a flow chart illustrating a target value operating process according to Embodiment 1 of the present invention.

In the next, a target value operating process in Step 205 of FIG. 2 will be described. FIG. 8 is a flow chart of a program for processing the target value operations.

(1) In Step 601, it is judged whether or not the driver is unconscious in reference of a flag Ycons, namely whether or not the flag Ycons is set.

(2) When the flag Ycons is set, Step 602 is selected to judge whether or not the amount of stepping brake Zbrake is a predetermined value Xbrake or more, namely whether or not the brake pedal 101 is stepped.

(3) When Zbrake≧Xbrake, Step 603 is selected to judge whether or not the approach index Zα is a predetermined value Xα or more, namely whether or not Zα≧Xα.

Figure 9:
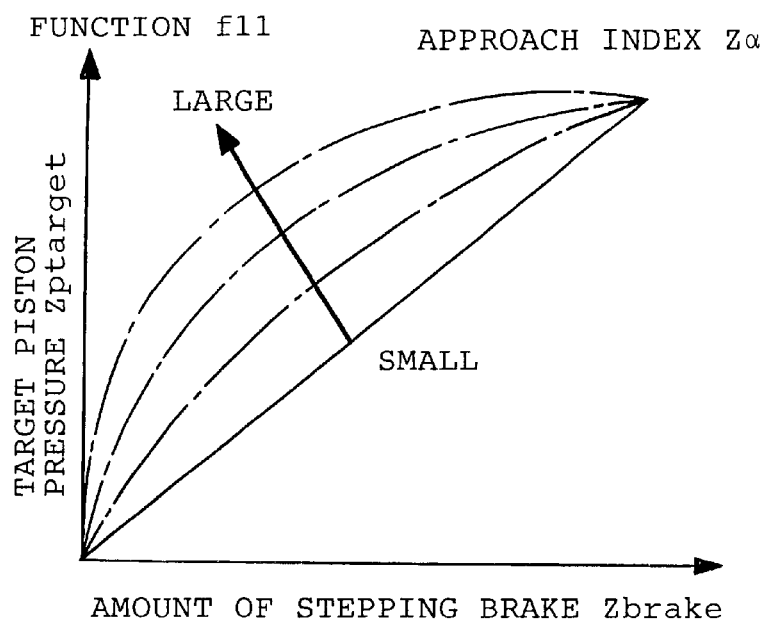
FIG. 9 is a graph showing a function f11 related to an amount of stepping a brake and a characteristic of target piston pressure according to Embodiment 1 of the present invention.

(4) When Zα≧Xα, Step 604 is selected to operate a target piston pressure Zptarget by a function f11 illustrated in FIG. 9 based on the amount Zbrake of stepping the brake pedal 112 and the approach index Zα.

(5) According to the function f11, the target piston pressure Zptarget is proportional to the amount of stepping brake Zbrake, and a characteristic of the target piston pressure Zptarget is changed in response to the magnitude of the approach index Zα as illustrated in FIG. 9. This means that the target piston pressure Zptarget is stet to be large to increase a braking force as probability of colliding with a preceding vehicle by an own vehicle is high.

(6) When the flag Ycons is not set, i.e. Zbrake≧Xbrake or Zα≧Xα is not established, Step 605 is selected to substitute 0 into the target piston pressure Zptarget. For example, when Zα=1/Xtmax, namely in a case that the own vehicle will not collide with the preceding vehicle, Xα is set to be Zα<Xα, whereby the target piston pressure is set to be 0 to bring the piston to an initial position on the right end of FIG. 1; and the wheel cylinder pressure is in conformity with a pressure and a braking force corresponding to the amount of stepping the brake pedal 101.

(7) After processing Steps 601 through 605, Step 206 illustrated in FIG. 2 is selected.

In the next, an output process in Step 206 in FIG. 2 will be described.

Figure 10:
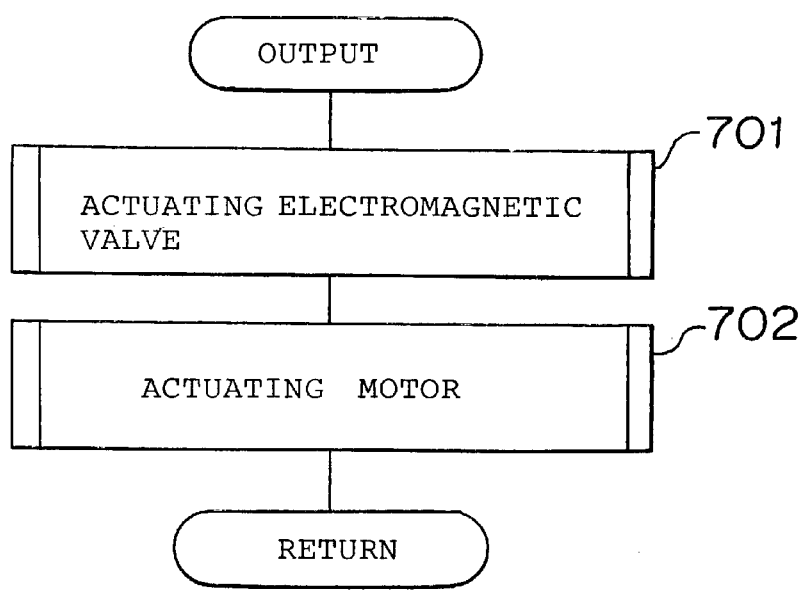
FIG. 10 is a flow chart illustrating an output process according to Embodiment 1 of the present invention.

FIG. 10 is a flow chart of a program of the output process.

(1) In Step 701, the pressurizing electromagnetic valve 112 and the depressurizing electromagnetic valve 120 are driven in response to an accumulator pressure Zpacc and a piston pressure Zppiston to bring the piston pressure Zppiston to the target piston pressure operated in the target value operating process.

(2) In Step 702, when a drop of an oil pressure of the accumulator 111 toward the same as a predetermined value or less is detected by the accumulator pressure sensor 116, the motor 108 is rotated to successively maintain the oil pressure the same as the predetermined value or more.

(3) After processing Steps 701 and 702, Step 202 in FIG. 2 is selected to repeatedly execute the above-mentioned processes by a predetermined period.

The dangerous approach prevention device according to Embodiment 1 judges that a driver is unconscious of a front of an own vehicle for a predetermined time period while the timer Ztimer1 counts after judging dozing driving by detecting this based on a nature that the driver tries to correct a track of the own vehicle by abruptly steering at an instant of waking up from dozing in an initial stage of the dozing driving.

Further, the device operates a time for colliding with preceding vehicles based on an accelerating degree of the own vehicle, accelerating degrees of the preceding vehicles, relative velocities, and following-on ranges and places a reciprocal of the time as the approach index. Further, when the driver is unconscious and the approach index has a predetermined value or more, the device controls a braking force of the own vehicle based on the amount of stepping a brake pedal by the driver and the approach index.

According to this structure, in case that the time Zt for colliding with the preceding vehicle is extremely short and the driver is unconscious by dozing, namely the own vehicle can not safely run with respect to the preceding vehicle, the approach index becomes larger than 0. At this time, provided that data Xα for switching the characteristic between the amount of stepping brake and the target piston pressure is set to be Zα≧Xα, the wheel cylinder pressure ordinarily determined by the amount of stepping brake to be a unique in accordance with the characteristic of piston pressure of the function f11 is now controlled by the approach index and the amount of stepping brake, wherein the wheel cylinder pressure is controlled to be high as a value of the approach index Zα is large even though the amount of stepping brake remains the same, whereby the braking force of the own vehicle is enhanced than usual.

In case that the time Zt for colliding with the preceding vehicle is extremely long, namely the own vehicle safely runs with respect to the preceding vehicle, the approach index Zα becomes a value close to 0. At this time, provided that Zα<Xα, the wheel cylinder pressure is uniquely determined by the amount of stepping brake as usual, the braking force becomes that corresponding to the amount of manipulating the brake pedal 101 by the driver. As a result, a relationship between the braking manipulation and the wheel cylinder pressure does not change from normal, a manipulation by the driver seemingly takes priority.

In Embodiment 1, in case that a collision does not occur even though a following-on range is very short, for example, a velocity of preceding vehicle is higher than that of an own vehicle and the preceding vehicle is accelerating, because an approach index Zα is set to be close to 0, a wheel cylinder pressure is uniquely determined by the amount of stepping brake as usual to demonstrate a braking force corresponding to the amount of manipulating the brake pedal 101 by a driver, wherein a manipulation by the driver takes priority.

Accordingly, it is possible to prevent an excessive approach and further a collision with the preceding vehicle and to enhance safety of the own vehicle only when the driver is unconscious of a front of the own vehicle, i.e. dozing driving, without deteriorating driving feeling by the driver.

Although a structure of the dangerous approach prevention device according to Embodiment 1 enhances a braking force by monitoring and adjusting a pressure applied to the piston 114 by the piston pressure sensor 121, a wheel cylinder sensor for detecting a pressure applied into the wheel cylinder 103 may be used instead of the piston pressure sensor 121 to thereby control a braking force by monitoring the wheel cylinder pressure by the wheel cylinder pressure sensor.

A structure of the dangerous approach prevention device according to Embodiment 1 enhances a braking force by increasing a wheel cylinder pressure by a piston mechanism of the piston 114 and the cylinder 113 using an accumulator pressure as a source. However, the present invention is not limited to such a structure and is applicable to a structure which controls various braking forces. For example, the piston mechanism of the piston 114 and the cylinder 113 may be omitted in FIG. 1.

For example, the accumulator 1.16, the pump 109, the motor 108, the pressuring electromagnetic valve 12, the depressurizing 120, and the reservoir 110 may be omitted to instead adjust the wheel cylinder pressure by electrically controlling a position of the piston.

Also the accumulator 116, the pump 109, the motor 108, the pressurizing electromagnetic valve 112, the depressurizing electromagnetic valve 120, the reservoir 110, the cylinder 113, the piston 114, and the check valve 115 may be omitted to instead adjust the wheel cylinder pressure by electrically controlling a position of a piston in the master cylinder.

Further, the accumulator 116, the pump 109, the motor 108, the pressurizing electromagnetic valve 112, the depressurizing electromagnetic valve 120, the reservoir 110, the cylinder 113, the piston 114, and the check valve 115 may be omitted to instead control a negative pressure in a master vac for amplifying a stepping force applied to the brake pedal 101 by the driver.

Further, brake discs rotating in association with tires may be braked by pressing using a force generated by an electric motor.

Further, the vehicle may be braked by a decelerating energy accompanied by generation of electricity in the electric motor.

Further, the unconsciousness judging process according to Embodiment 1 judges that the driver is dozing in driving when the degree of changing the steering angle within the predetermined time period becomes the predetermined value or more even once. However, it is possible to reduce probability of erroneous judgement by judging the dozing drive when a frequency that the degree of changing the steering angle within the predetermined time period is detected to be the predetermined value or more.

Figure 4:
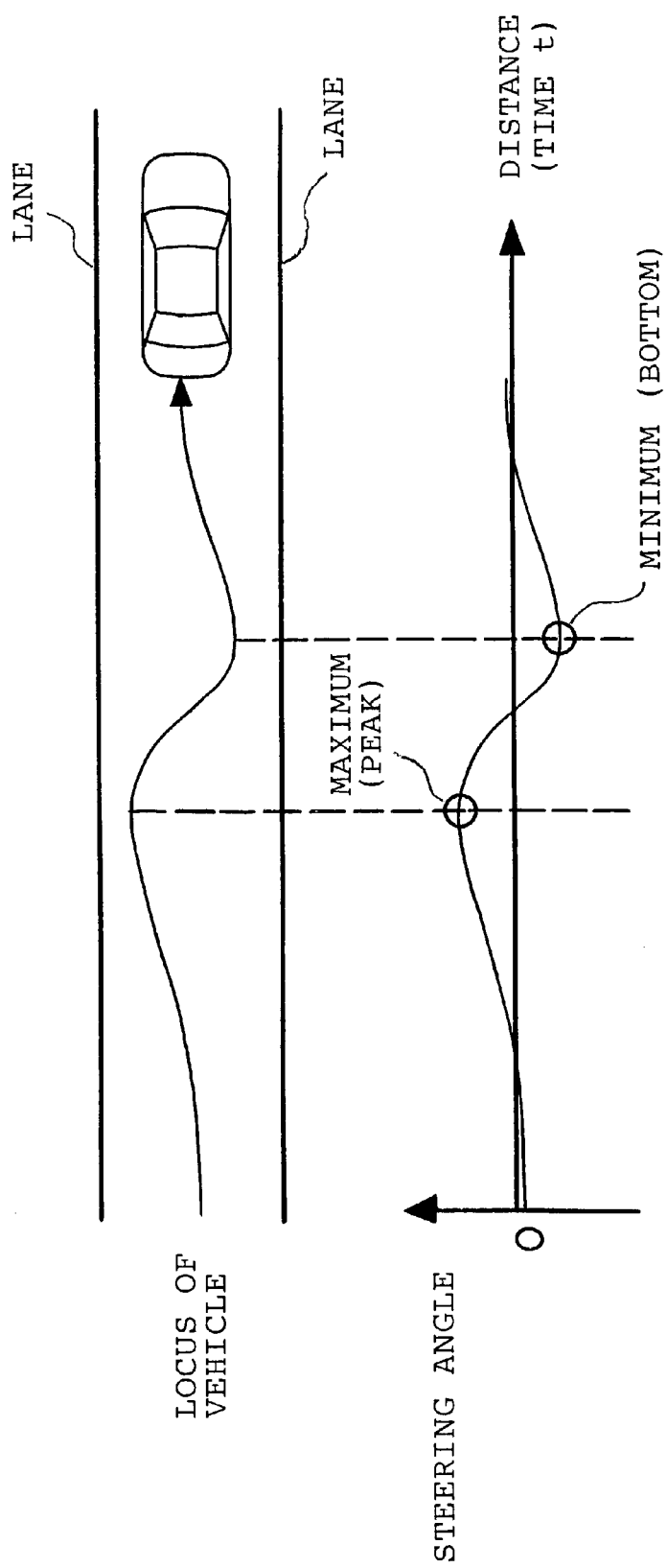
FIG. 4 is a time chart illustrating an outline of an unconsciousness judging process according to Embodiment 1 of the present invention.

Further, it may be judged that the driver is in a dozing drive when a condition that an interval Zt_diff between a maximum (peak) and a minimum (bottom) of the steering angle in FIG. 4, obtained and memorized, is smaller than a predetermined value and an amplitude Zstr_diff is larger than a predetermined value, or when a frequency of satisfying this condition within a predetermined time period is larger than a predetermined value.

In ordinary roads where vehicles run at relative low velocities, because direction changes such as lane changes, turning right and left in intersections, and so on frequently occur, it is difficult to detect dozing drives with a high accuracy in use of only steering angles. Therefore, probability of erroneous judgement of dozing drives may be reduced by judging whether or not drivers are dozing in drives when current positions of the vehicles are in express highways by inputting information about the current positions from a navigation system.

Further, dozing drives may be judged when a condition that a degree of changing a heading angle, i.e. directional change, within a predetermined time period becomes a predetermined value or more or that a frequency of satisfying this condition within a predetermined time period becomes a predetermined value or more is satisfied, by providing a gyro sensor used in a navigation system and so on and detecting angles of turning at corners and intersections instead of the steering angle sensor 122.

Further, dozing drives may be judged when a condition that an interval between a maximum (peak) and a minimum (bottom) of the directional changes, obtained and memorized, is smaller than a predetermined value and an amplitude is larger than a predetermined value or that a frequency satisfying this condition within a predetermined time period is larger than a predetermined value.

A similar process may be conducted based on a signal of a lateral acceleration sensor for detecting lateral accelerating degrees of a vehicle, provided instead of the steering angle sensor 122.

Further, dozing drives may be judged when intervals of blinks of a driver obtained by processing a face image shot by a camera 123 for shooting a face of the driver, which camera 123 is provided instead of the steering angle sensor 122, or when an average value of the intervals of blinks within a predetermined time period is larger than a predetermined value. Further, dozing drives may be judged when a frequency of blinks within a predetermined period becomes a predetermined value or less.

Figure 11:
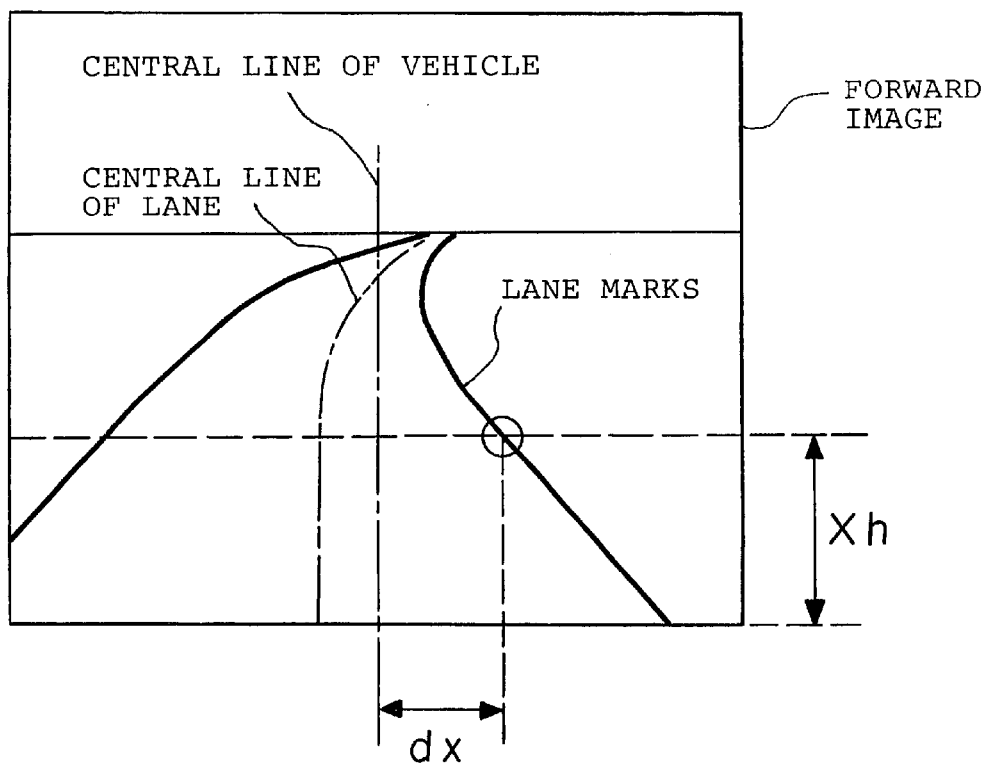
FIG. 11 shows a forward image shot by a camera according to Embodiment 1 of the present invention.

Further, a camera 123 for shooting a forward image of a vehicle may be provided instead of the steering angle sensor 122. As illustrated in FIG. 11, the camera 123 recognizes lane marks at a position being forward by a predetermined height Xh in the forward image, i.e. a predetermined distance Xhd. Then, a distance dx between the right lane mark, uniquely determined by a heading direction of the vehicle, and a central line of the vehicle at the predetermined distance Xhd are operated. A maximum (peak) and a minimum (bottom) of changing the distance dx are obtained and memorized. When a condition that a time interval between the peak and the bottom is smaller than a predetermined value and an amplitude is larger than a predetermined value or that a frequency of satisfying such a condition within a predetermined time period is larger than a predetermined value is satisfied, dozing drives may be judged.

Needless to say that, a distance between a position of a left lane and the central line of the vehicle may be set to be dx.

Further, a distance between central positions of left and right lanes and the central line of the vehicle may be set to be dx.

Further, a similar process may be conducted by recognizing the lane mark by shooting a backward image instead of the forward image.

Figure 12:
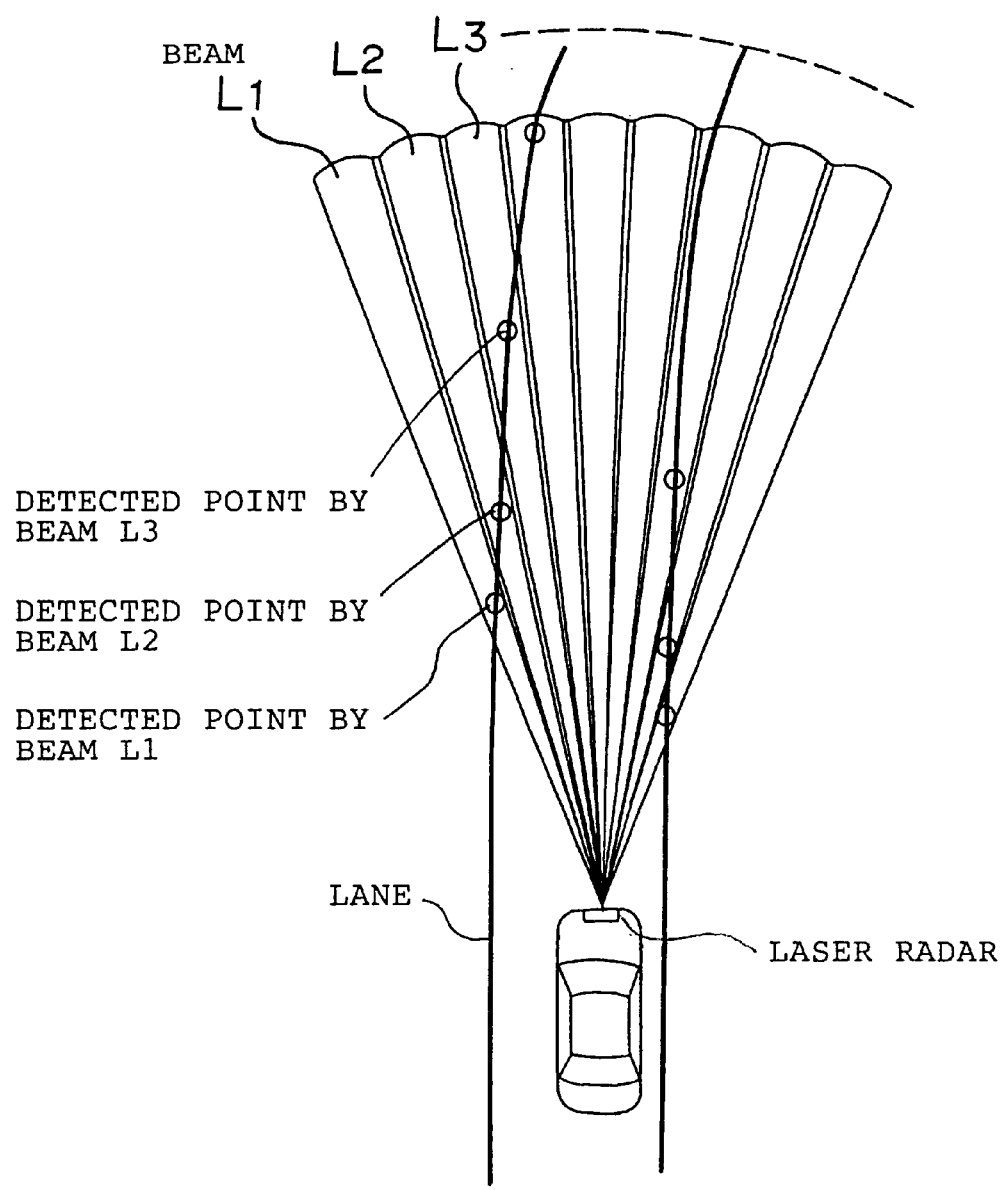
FIG. 12 schematically shows a mechanism of detecting lanes using a laser radar according to Embodiments 1 and 5 of the present invention.

It may be possible to obtain a position of the lane marks at a predetermined distance Xhd by recognizing these based on distances to detected points obtainable by reflecting at the marks of light beams of L1, L2, L3, . . . in various directions as illustrated in FIG. 12, which light beams are emitted and detected by a laser radar for emitting lights in various directions in a front of the own vehicle and obtain ranges to obstacles based on times from the emission to receipt of the lights reflected by the obstacles instead of the steering angle sensor.

Figure 13:
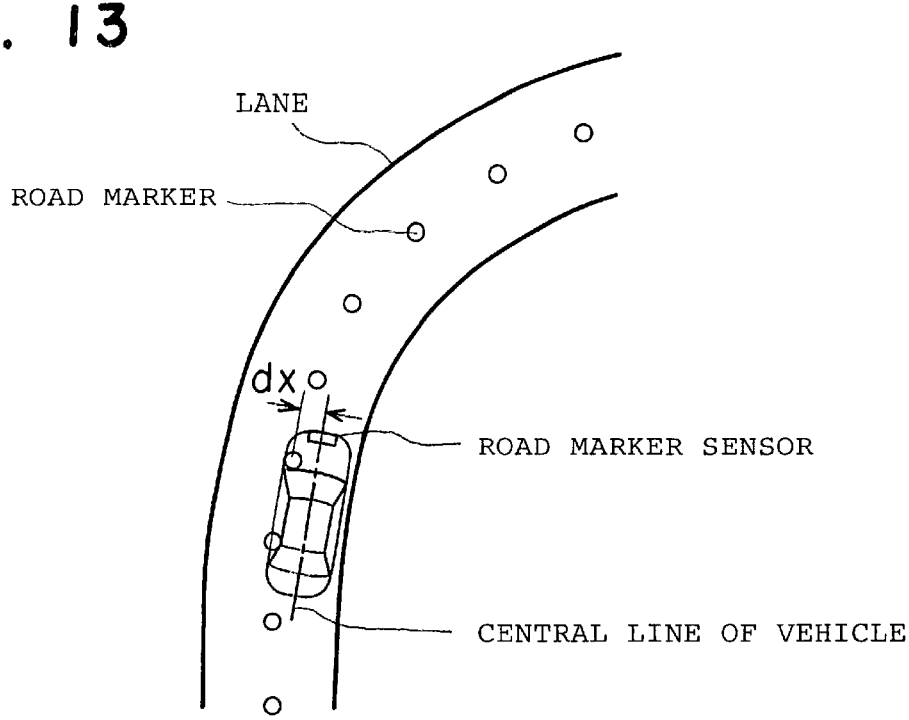
FIG. 13 schematically shows a mechanism of detecting lanes using road markers according to Embodiments 1 and 5 of the present invention.

Further, a sensor for detecting road markers embedded or located in a road may be used instead of the steering sensor 122 to determine a value based on ranges from a position of the sensor to the road markers may be set to be dx as illustrated in FIG. 13.

Further, although the above-mentioned central line of the vehicle is a line uniquely determined with respect to a direction of the vehicle, the central line may be a running track curve of the own vehicle estimated based on at least the vehicle velocity and the steering angle.

Figure 14:
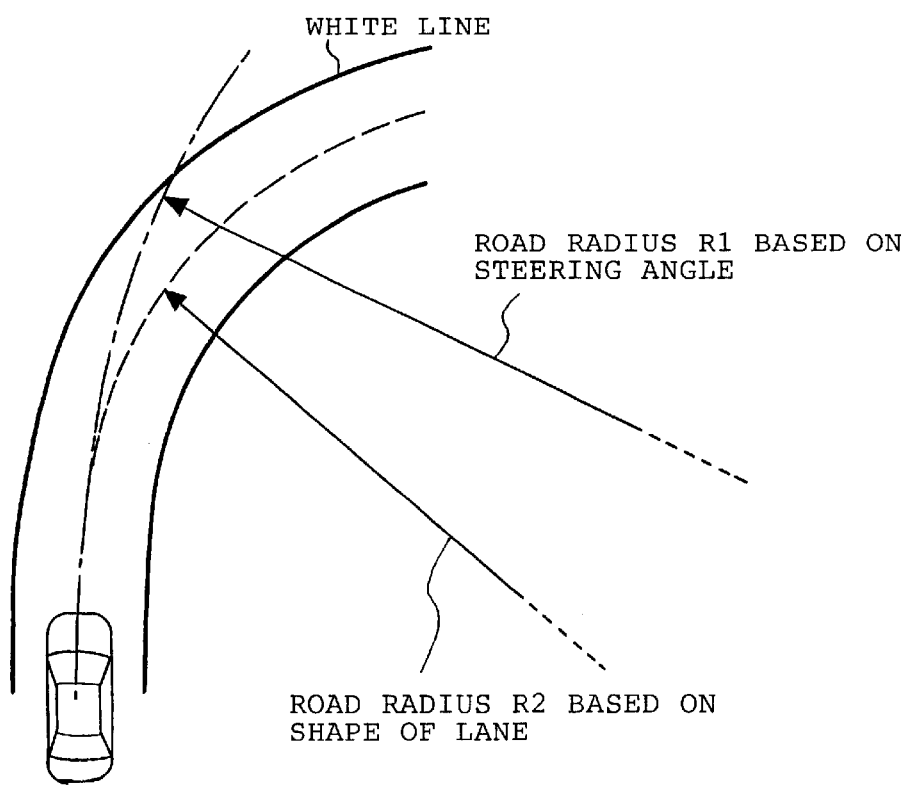
FIG. 14 schematically shows a mechanism of detecting a radius of road according to Embodiments 1 and 5 of the present invention.

Further, it may be possible to judge dozing drivings when an absolute value of a difference between a radius of road R1 and a radius of road R2 has a relationship of "|R1−R2|≧predetermined value", or a frequency of satisfying "|R1−R2|≧the predetermined value" within a predetermined period is larger than the predetermined value by providing both of the steering angle sensor 122 and a camera 123 for shooting a front image from the own vehicle, where the radius of road R1 is operated based on at least a vehicle velocity and a steering angle, and the radius of road R2 is operated based on a shape of lane obtainable by processing the front image as illustrated in FIG. 14.

A maximum (peak) and a minimum (bottom) of a difference of (R1−R2) may be obtained and memorized to judge dozing driving when a time interval between the peak and the bottom is smaller than a predetermined value and an amplitude Z is larger than a predetermined value or a frequency of satisfying such conditions within a predetermined time period is larger than a predetermined value.

A shape of lane may be obtained by comparing a position of the own vehicle obtained from a satellite using a navigation with a data base of map instead of the camera 123.

The radius of road R2 may be obtained by recognizing the lane marks based on a range from a detected point obtained from light beams L1, L2, L3, . . . reflected by the lane marks in various directions as illustrated in FIG. 12, in use of a laser radar, which emits lights in various directions of a front of the own vehicle and calculates ranges from obstacles based on times between the emissions and receipts of the lights reflected by the obstacles instead of the camera 123.

Embodiment 2

Figure 15:
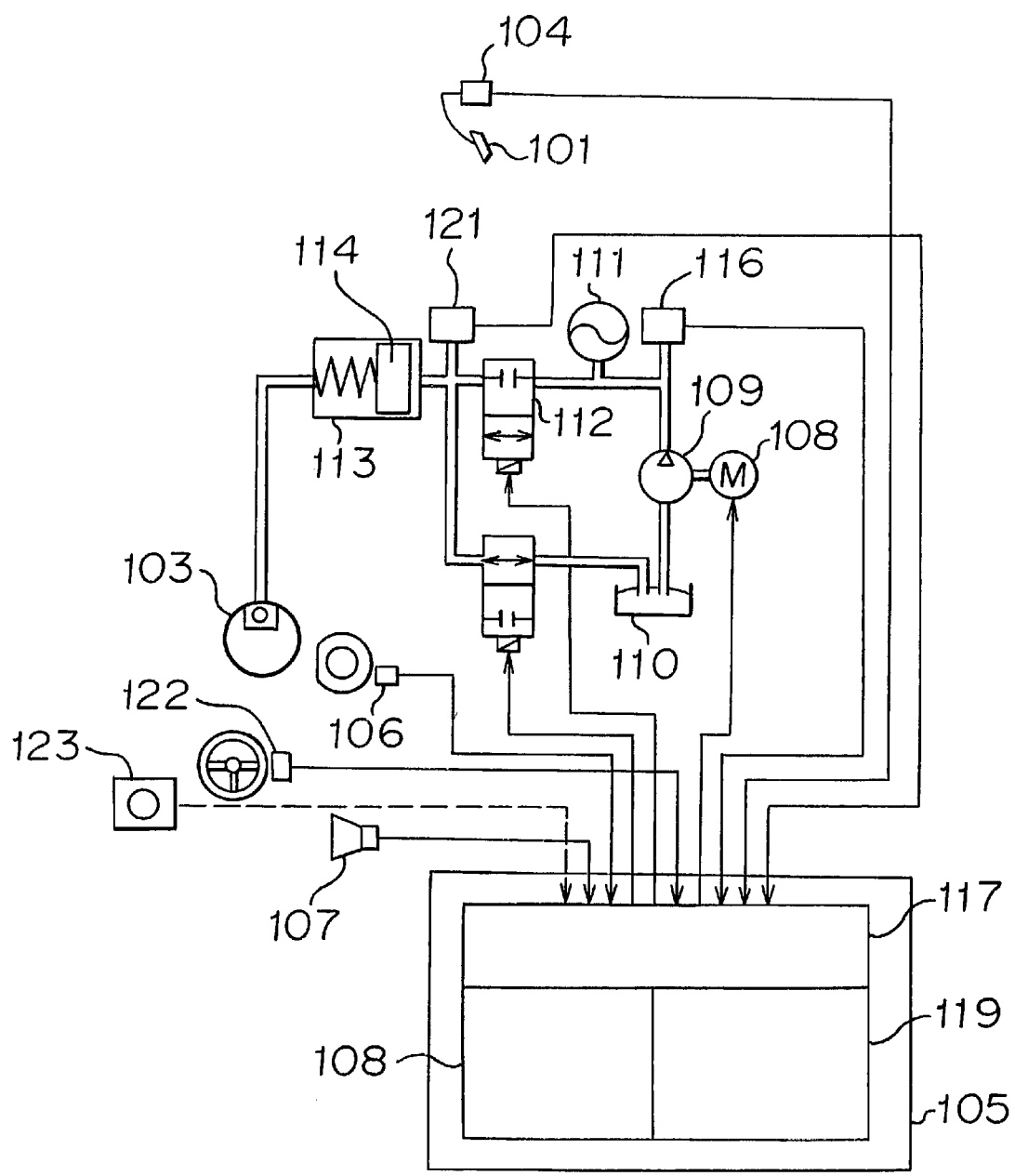
FIG. 15 schematically shows a structure of a system realizing a dangerous approach prevention device according to Embodiment 2 of the present invention.

A schematical structure of an dangerous approach prevention device according to Embodiment 2 is as illustrated in FIG. 15. Differences from FIG. 1 are that a brake pedal 101 manipulated by a driver and a wheel cylinder 103 are mechanically separated.

Figure 16:
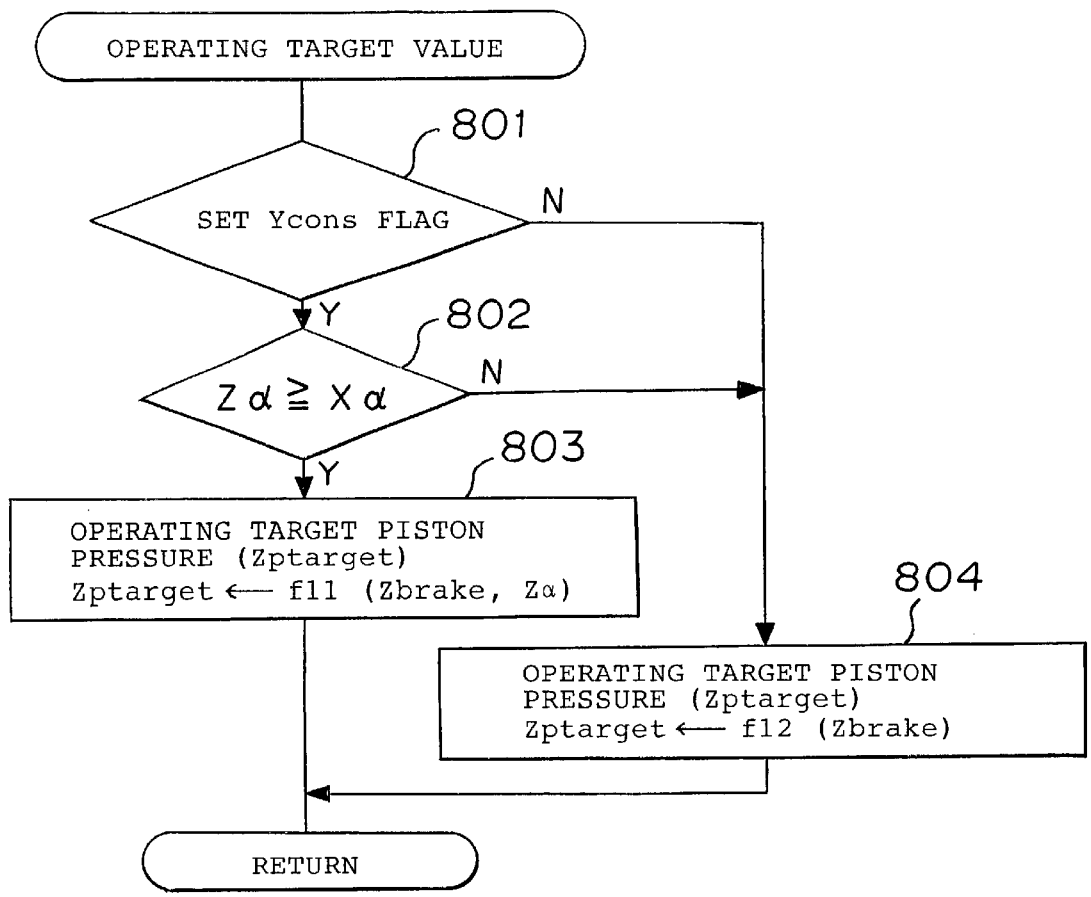
FIG. 16 is a flow chart illustrating a target value operating process according to Embodiment 2 of the present invention.

In a program of the dangerous approach prevention device according to Embodiment 2, the target value operating process of Embodiment 1 is changed to a process illustrated in FIG. 16 based on Embodiment 1.

(1) In Step 801, it is judged whether or not the driver is unconscious by a Ycons flag, namely whether or not the Ycons flag is set.

(2) When the Ycons flag is set, Step 802 is selected to judge whether or not the approach index $Z\alpha$ is the same as a predetermined value $X\alpha$ or more, i.e. $Z\alpha \geq X\alpha$.

(3) When $Z\alpha \geq X\alpha$, Step 803 is selected to operate a target piston pressure Zptarget by: the function f11 shown in FIG. 9 based on the amount of stepping brake Zbrake, and the approach index $Z\alpha$, where the function f11 is the same as that described in Embodiment 1.

Figure 17:
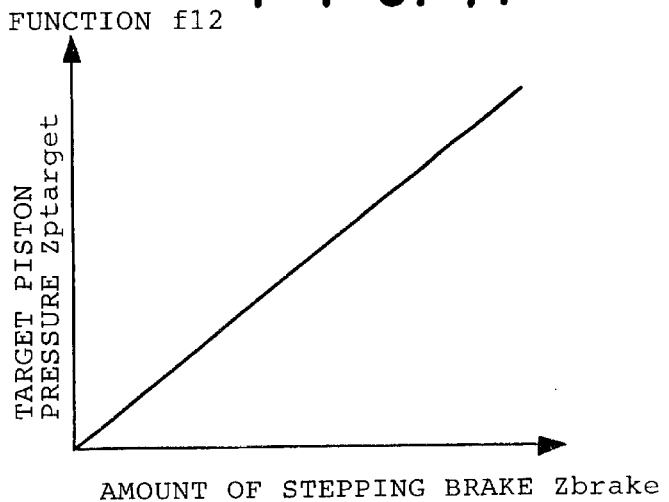
FIG. 17 is a graph showing a function f12 related to an amount of stepping a brake and a characteristic of target piston pressure according to Embodiment 2 of the present invention.

(4) When the Ycons flag is not set, i.e. $Z\alpha \geq X\alpha$ is not established, Step 804 is selected to operate a target piston pressure Zptarget using a function f12 shown in FIG. 17 based on the amount of stepping brake Zbrake. According to the function f12, the target piston pressure Zptarget is in proportional to the amount of stepping brake Zbrake to thereby set a wheel cylinder pressure corresponding to a manipulation of brake pedal by a driver.

(5) After processing Steps 801 through 804, Step 206 illustrated in FIG. 2 is selected.

According to Embodiment 2, similar effects to those of Embodiment 1 are obtainable.

Embodiment 3

Figure 18:
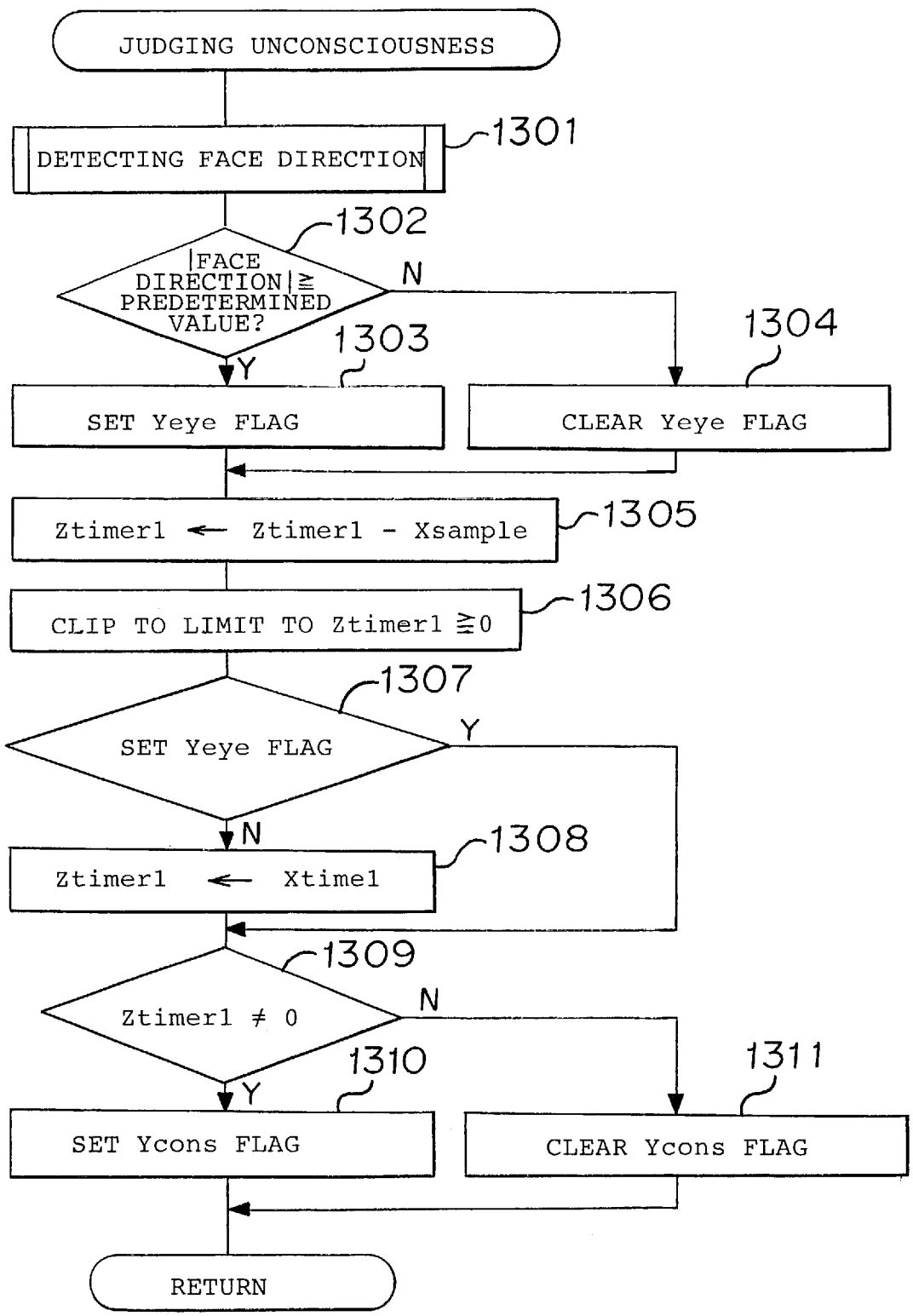
FIG. 18 is a flow chart illustrating an unconsciousness judging process according to Embodiment 3 of the present invention.

An unconsciousness judging process according to Embodiment 3 is changed from the unconsciousness judging process of Embodiment 1 or 2 to an unconsciousness judging process shown in FIG. 18 by providing a camera 123 for shooting a face of driver instead of the steering angle sensor 122.

References Ztimer1, Yeye, and ycons designate variables or flags, which are memorized in a memory unit 110 and can be written over and read out. References Xsample and Xtime1 designate data which are previously memorized in the memory unit 110, can only be read out, and can not be overwritten.

(1) In Step 1301, a face image of driver is processed to detect a direction of the face of driver.

(2) In Step 1302, it is judged whether or not an absolute value of the direction of the face is a predetermined value or more and also judged to be in a looking-aside driving when the absolute value of the direction of face is the predetermined value or more.

(3) In Step 1303, the Yeye flag is set.

(4) When the absolute value of the direction of face is less than the predetermined value, it is judged that the driver is not looking aside and Step 1304 is selected to clear the Yeye flag.

(5) In Step 1305, the timer Ztimer1 for judging a drop of consciousness with respect to a front of vehicle by looking aside is memorized again by counting down the sampling time Xsample, i.e. a period for operating a program in Embodiment 3.

(6) In Step 1306, the timer Ztimer1 is limited to a value of 0 or more.

(7) In Step 1307, it is judged whether or not the Yeye flag is set.

(8) When the Yeye flag is set, Step 1308 is selected to initialize the timer Ztimer1 to be Xtime1.

(9) In Step 1309, it is judged whether or not the timer Ztimer1≠0.

(10) When Ztimer1≠0, Step 1310 is selected to set the Ycons flag by judging that the driver is looking aside, namely he is unconscious with respect to a front of own vehicle.

(11) When Ztimer1≠0, Step 1311 is selected to clear the Ycons flag by judging that the driver is not looking aside, namely he is not unconscious.

(12) After processing Steps 1301 through 1311, Step 204 shown in FIG. 2 is selected.

The dangerous approach prevention device according to Embodiment 3, it is judged that the driver is looking aside when an absolute value of a direction of driver's face is a predetermined value or more and also he is unconscious of a front of his own vehicle for a predetermined time period thereafter.

According to this structure, in case that there is a danger of the own vehicle colliding with a preceding vehicle and the driver is looking aside, in other words, the own vehicle can not safely run with respect to the preceding vehicle, a wheel cylinder pressure uniquely determined by the amount of stepping brake under a normal driving is controlled by both of an approach index $Z\alpha$ and the amount of stepping brake, wherein the wheel cylinder pressure is controlled to be high as the value of approach index $Z\alpha$ is large even though the amount of stepping brake is not changed, whereby a braking force of the own vehicle is enhanced than usual.

When the own vehicle safely runs with respect to preceding vehicles, a wheel cylinder pressure is uniquely determined by the amount of stepping brake as usual regardless of a looking-aside driving, whereby a braking force corresponding to a manipulated amount of brake pedal 101 by the driver is obtainable.

As a result, a relationship between the amount of stepping brake and the wheel cylinder pressure does not change from that in a normal driving, whereby a manipulation by driver is seemingly given a priority. Accordingly, a drive feeling by the driver is not spoiled and safety of a vehicle is enhanced by avoiding excessive approaches to and collisions with the preceding vehicles only when the driver is unconscious with respect to a front of the own vehicle, namely a looking-aside driving.

Although a looking-aside detecting process according to Embodiment 3 detects a direction of driver's face by processing a face image of the driver and judges a looking-aside driving when an absolute value of the face direction is a predetermined value or more, it is also possible to judge the looking-aside driving when an absolute value of direction of eyes is a predetermined value or more by detecting the eyes of the driver by processing a face image of the driver.

Further, it is possible to judge the looking-aside driving using a logical product and/or a logical sum of both of the directions of driver's face and driver's eyes.

Embodiment 4

Figure 19:
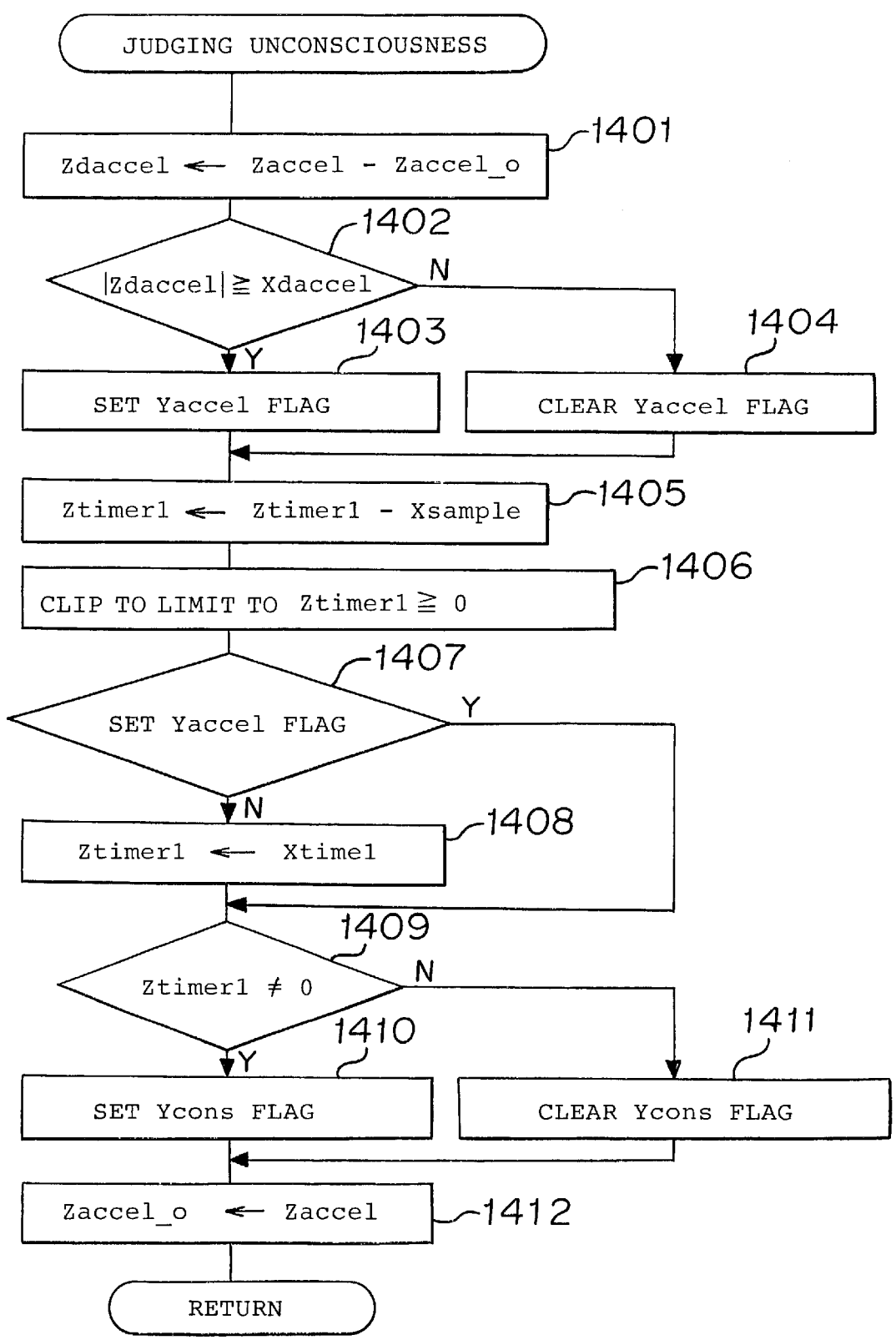
FIG. 19 is a flow chart illustrating an unconsciousness judging process according to Embodiment 4 of the present invention.
Figure 20:
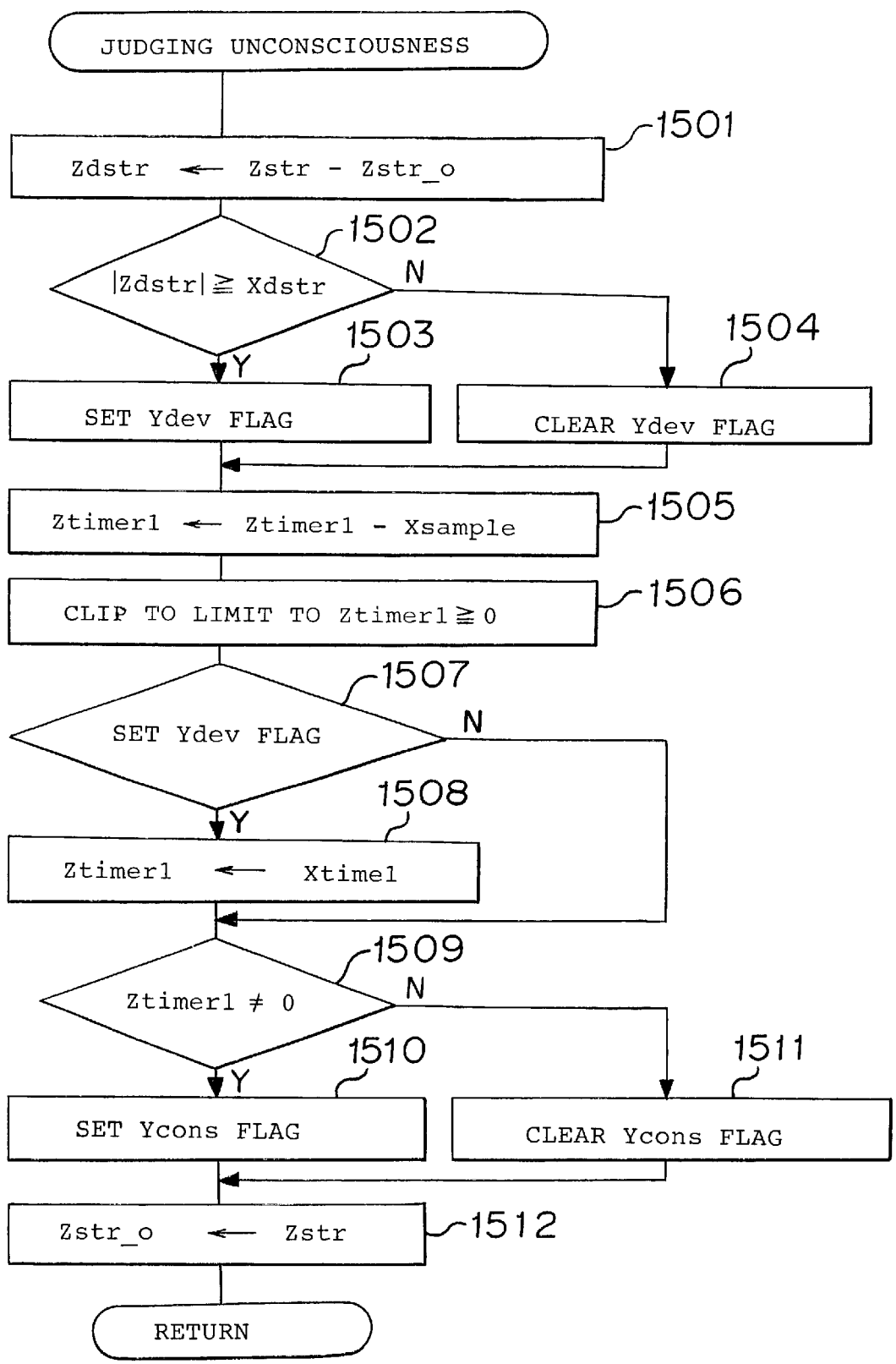
FIG. 20 is a flow chart illustrating an unconsciousness judging process according to Embodiment 5 of the present invention.

A structure and a program of a dangerous approach prevention device according to Embodiment 4 is based on Embodiment 1 or 2 and the unconsciousness judging process in Embodiment 1 or 2 is changed to a process of judging an intention of accelerating shown in FIG. 19.

References Zdaccel, Zaccel_o, Ztimer1, Yaccel, and Ycons designate variables or flags which are memorized in a memory unit 110, and can be written over and read out. References Xdaccel, Xsample, and Xtime1 designate data previously memorized in the memory unit 110, which can only be read out and can not be overwritten.

(1) In Step 1401, a difference between a currently inputted acceleration degree Zaccel and a previously inputted acceleration degree Zaccel_o, obtained in Step 1412, are memorized as a variable amount of acceleration degree Zdaccel.

(2) In Step 1402, it is judged whether or not an absolute value of the variable amount of acceleration degree Zdaccel is a predetermined value of Xdaccel or more, namely $|Zdaccel| \geq Xdaccel$.

(3) When $|Zdaccel| \geq Xdaccel$, Step 1403 is selected to set a Yaccel flag by judging that a driver has an intention of accelerating.

(4) When $|Zdaccel| Xdaccel$ is not established, Step 1404 is selected to clear the Yaccel flag.

(5) In Step 1405, a timer Ztimer1 for judging that the intention of accelerating continues by counting down a sampling time Xsample, i.e. a period of operating a program in Embodiment 4 to memorize it again.

(6) In Step 1406, the timer Ztimer1 is limited to be a value of 0 or more.

(7) In Step 1407, it is judged whether or not the Yaccel flag is set. When it is set, Step 1408 is selected to initialize the timer Ztimer1 to be Xtime1.

(8) In Step 1409, it is judged whether or not the timer Ztimer1≠0.

(9) When Ztimer1≠0 is not established, Step 1410 is selected to set the Ycons flag by judging that the driver does not have the intention of accelerating, namely the driver is unconscious.

(10) When Ztimer1≠0, Step 1411 is selected to clear the Ycons flag by judging that the intention of accelerating continues, namely the driver is not unconscious.

(11) In Step 1412, a currently inputted steering angle Zstr is memorized as a previously inputted steering angle Zstr_o for a next process.

(12) After processing Steps 1401 through 1412, Step 204 in FIG. 2 is selected.

A dangerous approach prevention device according to Embodiment 4 judges that a driver has an intention of accelerating when a variable amount of acceleration degree Zaccel is a predetermined value or more and that the driver is not unconscious of a front of an own vehicle for a predetermined time period thereafter.

According to this structure, in case that the own vehicle is intentionally approaching to preceding vehicles or the own vehicle is trying to pass preceding vehicles running in a same lane, a wheel cylinder pressure is uniquely determined by the amount of stepping brake as in an ordinary driving and therefore a braking force corresponds to the amount of manipulating a brake pedal 101 by the driver.

As a result, a relationship between the amount of stepping brake and the wheel cylinder pressure does not change from the ordinary driving, wherein a manipulation by the driver is seemingly given first priority.

Accordingly, a feeling of driving, i.e. the intention of accelerating, of the driver is not spoiled, and excessive approaches to and collisions with preceding vehicles can be avoided to enhance safety of the vehicle only in a case that the driver is unconscious of a front of the own vehicle.

The unconsciousness judging means according to Embodiment 4 judges that the driver has an intention of accelerating when the variable amount of the acceleration degree Zaccel within the predetermined time period is the predetermined value or more, and judges that the driver is not unconscious for the predetermined time period thereafter, i.e. while the timer Ztimer1 is operated. However, it may be judged that the driver has the intention of accelerating when the acceleration degree Zaccel has a predetermined value or more and the driver is not unconscious for a predetermined time period thereafter, i.e. while a timer Ztimer1 is operated.

Further, it may be possible to judge whether or not the driver has the intention of accelerating depending on an accelerator switch provided to detect whether or not an accelerator is stepped by a predetermined amount in place of the acceleration degree sensor.

Further, it may be judged that the driver has the intention of accelerating when an accelerating pedal 112 is stepped at least within a predetermined time period after the driver changed to lower gears and the driver is not unconscious for a predetermined time period thereafter.

Although, in Embodiment 4, the judging process of detecting unconsciousness has been described. However, the judging process may be to judge that the driver is not unconscious. Therefore, this can be called a consciousness judging process. Further, this consciousness judging process may be inserted between Steps 203 and 204 of FIG. 2.

Embodiment 5

A structure and a program of a dangerous approach prevention device according to Embodiment 5 is based on Embodiment 1 or 2 and the unconsciousness judging process thereof is changed to a process of detecting an intention of lane changing.

References Zdstr, Ztimer1, Zstr_o, Ydev, and Ycons are variables or flags, which are memorized in a memory unit 110 and can be overwritten and read out. References Xdstr, Xsample, and Xtime1 are data which are previously memorized in the memory unit 110, can not be overwritten, and can only be read out.

(1) In Step 1501, a difference between a currently inputted steering angle Zstr and a previously inputted steering angle Zstr_o, obtained in Step 1512, is memorized as a degree of change of steering angle Zdstr.

(2) In Step 1502, it is judged whether or not an absolute value of the degree of changing steering angle Zdstr is a predetermined value Xdstr or more, i.e. $|Zdstr| \geq Xdstr$.

(3) When $|Zdstr| \geq Xdstr$, Step 1503 is selected to judge that a driver has an intention of changing lanes, wherein the Ydev flag is set.

(4) When $|Zdstr| \geq Xdstr$ is not established, Step 1504 is selected to clear the Ydev: flag.

(5) In Step 1505, the timer Ztimer1 for judging that the lane change is continued is memorized again by counting down the sampling time Xsample.

(6) In Step 1506, the timer Ztimer1 is limited to be a value of 0 or more.

(7) In Step 1507, it is judged whether or not the Ydev flag is set.

(8) When the Ydev flag is set, Step 1508 is selected to initialize the timer Ztimer1 to be Xtime1.

(9) In Step 1509, it is judged whether or not the timer Ztimer1≠0.

(10) When Ztimer1≠0, Step 1510 is selected to judge that the lanes are changed, namely the driver is unconscious of a front of an own vehicle, wherein the Ycons flag is set.

(11) When Ztimer1≠0, Step 1511 is selected to judge that lanes are not changed, namely the driver is not unconscious, wherein the Ycons flag is cleared.

(12) In Step 1512, the currently inputted steering angle Zstr is memorized as the previously inputted steering angle Zstr_o for the next execution in this sequential process.

(13) After processing Steps 1501 through 1512, Step 204 in FIG. 2 is selected.

The dangerous approach prevention device according to Embodiment 5 judges that the driver has an intention of changing lanes when the absolute value of the degree of changing steering angle Zdstr within a predetermined time period is a predetermined value or more and also that the driver is unconscious of a front of the own vehicle for a predetermined time period thereafter, while which period the timer Ztimer1 is operated.

According to this structure, when there is a risk that the own vehicle and the preceding vehicle are collided each other and the driver tries to change lanes, in other words, a case that the own vehicle can not safely run with respect to the preceding vehicle, the wheel cylinder pressure ordinarily uniquely determined by the amount of stepping brake are controlled by the approach index Zα and the amount of stepping brake. Even though the amount of stepping brake is not changed, the wheel cylinder pressure is controlled to be high as the approach index Zα has a large value, whereby a braking force of the own vehicle is enhanced than usual.

When the own vehicle safely runs with respect to preceding vehicles, the wheel cylinder pressure is uniquely determined by the amount of stepping brake as usual regardless of the driver's intention of changing lanes, whereby a braking force corresponding to the amount of manipulating the brake pedal 101 by the driver is obtainable.

As a result, a relationship between the manipulation of brake and the wheel cylinder pressure is not changed from the ordinary driving, whereby a manipulation by the driver is seemingly given first priority.

Accordingly, a drive feeling by the driver is not spoiled, and excessive approaches to and collisions with preceding vehicles can be avoided only in a case that the driver is unconscious of a front of the own vehicle, namely while changing lanes, whereby safety of the own vehicle is enhanced.

Although the unconsciousness judging means according to Embodiment 5 judges that the driver has the intention of changing lanes when the absolute value of the degree of changing steering angle Zdstr within a predetermined time period is a predetermined value or more, and also the driver is unconscious of a front of the own vehicle for a predetermined period thereafter, while which period the timer Ztimer1 is operated. However, it is also possible to judge that the driver has the intention of changing lanes when a turn signal indicator is at least in a state of ON, namely a directional indication of right or left is exhibited, and a predetermined period after the ON state by providing a turn signal indicator switch, which can detect states of ON or OFF of the turn signal indicator operated by the driver in place of the steering angle sensor 122.

Further, a camera 123 for shooting a front image of the own vehicle may be provided instead of the steering angle sensor 122. As illustrated in FIG. 11, at a position forward by a predetermined distance Xhd, namely a predetermined height Xh in a forward image, lane marks are recognized. In the next, a position of right lane marks at a predetermined distance Xhd, which is uniquely determined by a direction of the own vehicle, and a distance dx from a central line of the own vehicle are operated. When the absolute value of the distance dx is larger than a predetermined value, it may be possible to judge that the driver has the intention of changing lanes.

Needless to say that a distance between left lane marks and the central line of vehicle to be dx.

Further, it is also possible to make distances between a central position of the left and right lanes and the central line of vehicle to be dx.

Further, it is also possible to conduct a similar process by recognizing lane marks by shooting a backward image of the own vehicle instead of the forward image of the own vehicle.

Further, a laser radar for obtaining a range to obstacles based on a time from emissions of lights in various directions of a front of the own vehicle and receipts of lights reflected by the obstacles may be provided instead of the steering angle sensor. As illustrated in FIG. 12, the lane marks are recognized based on ranges to detected points obtained by reflections of the light beams of L1, L2, L3, . . . in various directions by the lane marks and a position of the lane marks at the predetermined distance Xhd is obtainable.

Further, instead of the steering sensor 122, a sensor for detecting road markers embedded or located in a road may be provided to make a value based on a range between a position of sensor and the road marker to be dx as illustrated in FIG. 13.

Further, although the central line of vehicle is a line uniquely determined by a direction of the vehicle, it may be a running track curve of the own vehicle estimated by at least a velocity and a steering angle of the own vehicle.

Further, it may be possible to provide both of the steering angle sensor 122 and the camera 123 for shooting a forward image of the own vehicle to operate a road radius R1 at least based on a velocity and a steering angle and a road radius R2 based on a shape of lane obtained by processing the front image as illustrated in FIG. 14. When an absolute value of a difference between the road radius R1 and the road radius R2 of "$|R1-R2| \geq$ predetermined value", it is possible to judge that the driver has the intention of changing lanes.

Further, the shape of lane may be obtained by collating with a position of the own vehicle obtained from a satellite and a map data base in use of a navigation system in place of the camera 123.

Further, a laser radar may be provided for obtaining ranges from obstacles based on a time between emissions of lights in various directions of the front of the own vehicle and receipts of lights reflected by the obstacles instead of using the camera 123. As illustrated in FIG. 12, the road radius R2 is obtained by recognizing the lane marks based on ranges from detected points obtained by reflections of the light beams of L1, L2, L3, . . . in various directions at the lane marks as illustrated in FIG. 12.

Embodiment 6

A structure and a program of a dangerous approach prevention device according to Embodiment 6 is based on Embodiment 4 or 5. The unconsciousness judging process of Embodiment 4 or 5 is used to detect both of intentions of accelerating and changing lanes by a driver, and when both of the intentions of accelerating and changing lanes by the driver is detected, it is judged that the driver tries to pass over preceding vehicles and accelerates, wherein it is also judged that the driver is not unconscious of a front of the own vehicle for a predetermined time period thereafter.

According to this structure, when the driver tries to pass over preceding vehicles and accelerates, the wheel cylinder pressure is uniquely determined by the amount of stepping brake as usual, whereby a braking force corresponds to the amount of manipulating a brake pedal 101 by the driver. As a result, a relationship between the manipulation of brake and the wheel cylinder pressure is not changed from that in an ordinary driving, wherein the manipulation by the driver is seemingly taken first priority.

Accordingly, a drive feeling, i.e. the intention of passing over and accelerating by the driver is not spoiled and excessive approaches to and collisions with the preceding vehicles are avoided only in a case that the driver is unconscious of a front of an own vehicle, whereby safety of vehicle is enhanced.

Embodiment 7

A structure and a program of a dangerous approach prevention device according to Embodiment 7 is based on Embodiment 1. The approach index operating process of Embodiment 1 is changed to a process illustrated in FIG. 21. References ZLtarget, ZdL, and ZAtarget are variables which are memorized in a memory unit 110 and can be overwritten and read out. References Xk1 and Xk2 are data which are previously memorized in the memory unit 110, can not be overwritten and can only be read out.

The approach index operating process illustrated in FIG. 21 will be described. This is a processing routine for operating a difference between a target accelerating degree for running with a predetermined following-on range from a forward obstacle or a preceding vehicle and an accelerating degree of an own vehicle.

At first, an idea of the target accelerating degree of the own vehicle for running with the predetermined following-on range from the forward obstacle or the preceding vehicle will be described.

Provided that the own vehicle is pursuing the preceding vehicle with a following-on range ZL (m), based on a position of the own vehicle, an absolute position Sp of the preceding vehicle after t seconds is expressed by Equation 1, and an absolute position Ss of the own vehicle after t seconds is expressed by Equation 2.

In order that the own vehicle runs with a target following-on range ZLtarget from the preceding vehicle, Equation 8 should be established.

$$Sp-Ss=ZLtarget \qquad \text{Equation 8}$$

By rearranging Equation 8 by substituting Equations 1 and 2 thereinto, Equation 9 is obtainable.

$$[(ZAp-ZAs)/2] \cdot t^2 + (ZVp-ZVs) \cdot t + (ZL-ZLtarget) = 0$$

$$[(ZAp-ZAs)/2] \cdot t2 + ZVr \cdot t + ZdL = 0 \qquad \text{Equation 9}$$

where ZVr designates a relative velocity (m/s) which equals to ZVp–ZVs, and

ZdL designates a deviation of following-on range (m) which equals to ZL–ZLtarget.

When Equation 9 is rearranged with respect to ZAs, Equation 10 is obtainable.

$$\begin{aligned} ZAs &= (2/t^2) \cdot ZdL + (2/t) \cdot ZVr + ZAp \qquad \text{Equation 10}\\ &= Xk1 \cdot ZdL + Xk2 \cdot ZVr + ZAp \\ &= ZAtarget \end{aligned}$$

where $Xk1 = 2/t^2$;

$Xk2 = 2/t$;

$t \geq 0$;

$Xk1 > 0$; and $Xk2 > 0$.

ZAs in Equation 10 designates the target accelerating degree ZAtarget of the own vehicle for running with a following-on range ZLtarget from preceding vehicles. References Xk1 and Xk2 are data uniquely determined by t.

In the next, a process of operating an approach index according to Embodiment 7 will be described.

Figure 22:
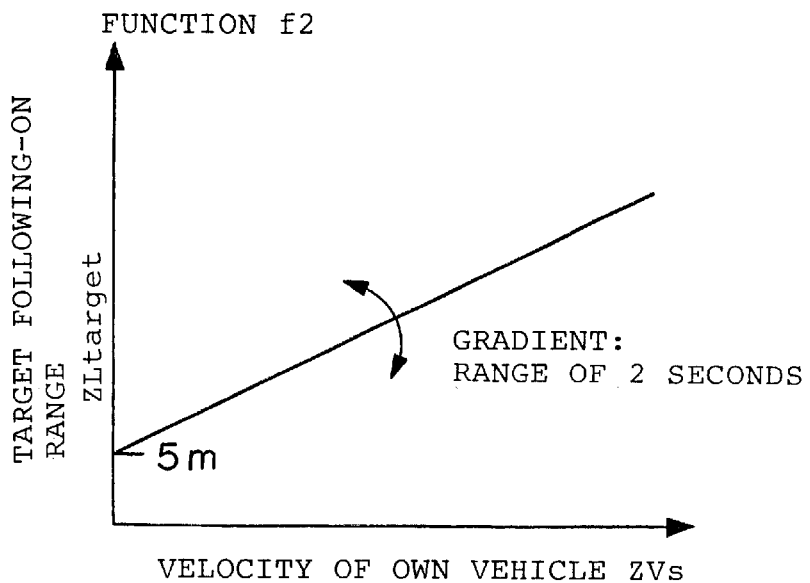
FIG. 22 is a graph showing a function f2 related to a characteristic of target following-on range according to Embodiment 7 of the present invention.

(1) In Step 1601, a target following-on range ZLtarget is operated by a function f2 illustrated in FIG. 22 based on a vehicle velocity of an own vehicle ZVs. According to the function f2, the target following-on range ZLtarget is uniquely determined by the velocity of the own vehicle ZVs, and a gradient of a line corresponds to a following-on time from the preceding vehicle. In Embodiment 7, the following-on time is set to be two seconds.

(2) In Step 1602, a target accelerating degree ZAtarget of Equation 10 is operated using, for example, t=0.5 sec; Xk1=8; and Xk2=4.

(3) In Step 1603, a difference between the target accelerating degree ZAtarget and the accelerating degree of the own vehicle ZAs are operated and substituted into the approach index Zα.

(4) After processing Steps 1601 through 1603, Step 205 in FIG. 2 is selected.

The dangerous approach prevention device according to Embodiment 7 operates a target,accelerating degree of the own vehicle for running with a predetermined following-on ranges from obstacles or preceding vehicles based on at least a target following-on range, an accelerating degree of the own vehicle, an accelerating degree of the preceding vehicle, a relative velocity, and a following-on range, and makes a difference between the target accelerating degree and the accelerating degree of the own vehicle to be the approach index Zα.

According to this structure, in case that a driver is unconscious of a front of an own vehicle and a following-on range after t seconds is smaller than the target following-on range, namely the own vehicle does not safely run with respect to the preceding vehicles, the approach index Zα becomes a positive value. At this time, if data Xα for switching a characteristic of the amount of stepping brake and a target piston pressure is set to be $Z\alpha \geq X\alpha$, a wheel cylinder pressure uniquely determined by the amount of stepping brake in an ordinary driving is controlled by the approach index $Z\alpha$ and the amount of stepping brake. As the approach index $Z\alpha$ is large even under the same amount of stepping brake, the wheel cylinder pressure is controlled to be high, whereby a braking force of the own vehicle is increased than that in an ordinary driving.

Further, in case that a following-on range after t seconds is larger than a target following-on range, namely the own vehicle safely runs with respect to the preceding vehicles, the approach index $Z\alpha$ becomes a negative value. At this time, provided that $Z\alpha<X\alpha$, the wheel cylinder pressure is uniquely determined by the amount of stepping brake as in an ordinary driving, whereby the braking force corresponds to the amount of manipulating a brake pedal 101 by a driver. As a result, a relationship between the manipulation of brake and the wheel cylinder pressure does not change from that in the ordinary driving, whereby a manipulation by the driver is seemingly taken first priority.

Accordingly, because the approach index representing a risk of colliding with forward obstacles or preceding vehicles can be accurately obtained, a drive feeling by a driver is not spoiled, and excessive approaches to and collisions with the preceding vehicles can be avoided, whereby safety of a vehicle is enhanced.

Although the target following-on range ZLtarget in Embodiment 7 is based on only the velocity of the own vehicle ZVs, it may be based on not only the velocity of the own vehicle ZVs but also a relative velocity to a preceding vehicle ZVr and an accelerating degree of the preceding vehicle ZAp.

Further, although the target accelerating degree ZAtarget in Embodiment 7 is to bring a current following-on range ZL into a target following-on range ZLtarget after a predetermined period, for example, t=0.5 sec, the target accelerating degree is not limited to obtain by such a method and various target accelerating degrees are applicable.

In Embodiment 7, references Xk1 and Xk2 are previously memorized as data. However, it is possible to make t a value corresponding to a relationship with the preceding vehicle and succeedingly operate Xk1 and Xk2. Specifically, t may be set as a time for colliding with obstacles or preceding vehicles described in Embodiment 1.

Embodiment 8

Figure 21:
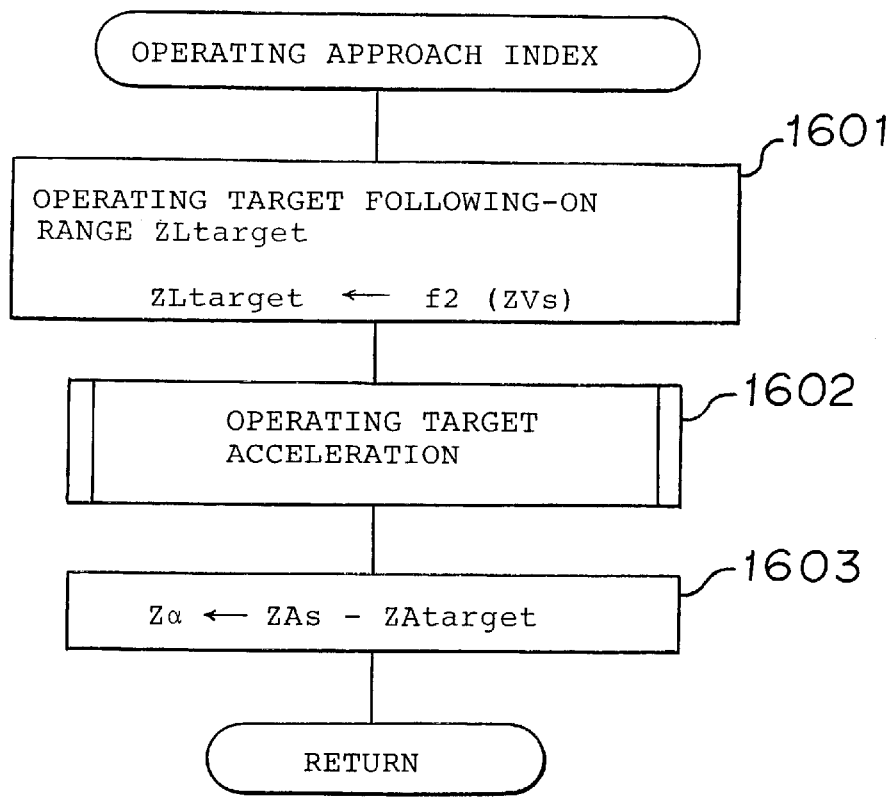
FIG. 21 is a flow chart illustrating an approach index operating process according to Embodiment 7 of the present invention.

A structure and a program of a dangerous approach prevention device according to Embodiment 8 is based on Embodiment 2, and the approach index operating process in Embodiment 2 is changed to a process illustrated in FIG. 21. According to this structure, effects similar to those in Embodiment 7 can be demonstrated.

Embodiment 9

A structure of a dangerous approach prevention device according to Embodiment 9 is based on FIG. 1 described in Embodiment 1. Further, a program thereof is based on Embodiment 1, and the approach index operating process is changed to a process illustrated in FIG. 23 and the target value operating process is changed to a process illustrated in FIG. 24.

References ZLtarget, ZdL, and ZAtarget are variables, which can temporarily memorize results of operation in a memory unit 118 and can be randomly read out. Reference Xm is data which is previously memorized in the memory unit 118 and can be read out.

The approach index operating process illustrated in FIG. 23 will be described. This process is a processing routine of operating an accelerating degree of an own vehicle for running with a safe following-on range from a forward obstacle or a preceding vehicle. The target accelerating degree of the own vehicle for running with the safe following-on range from the forward obstacle or the preceding vehicle is operated by Equations described in Embodiment 7.

Figure 24:
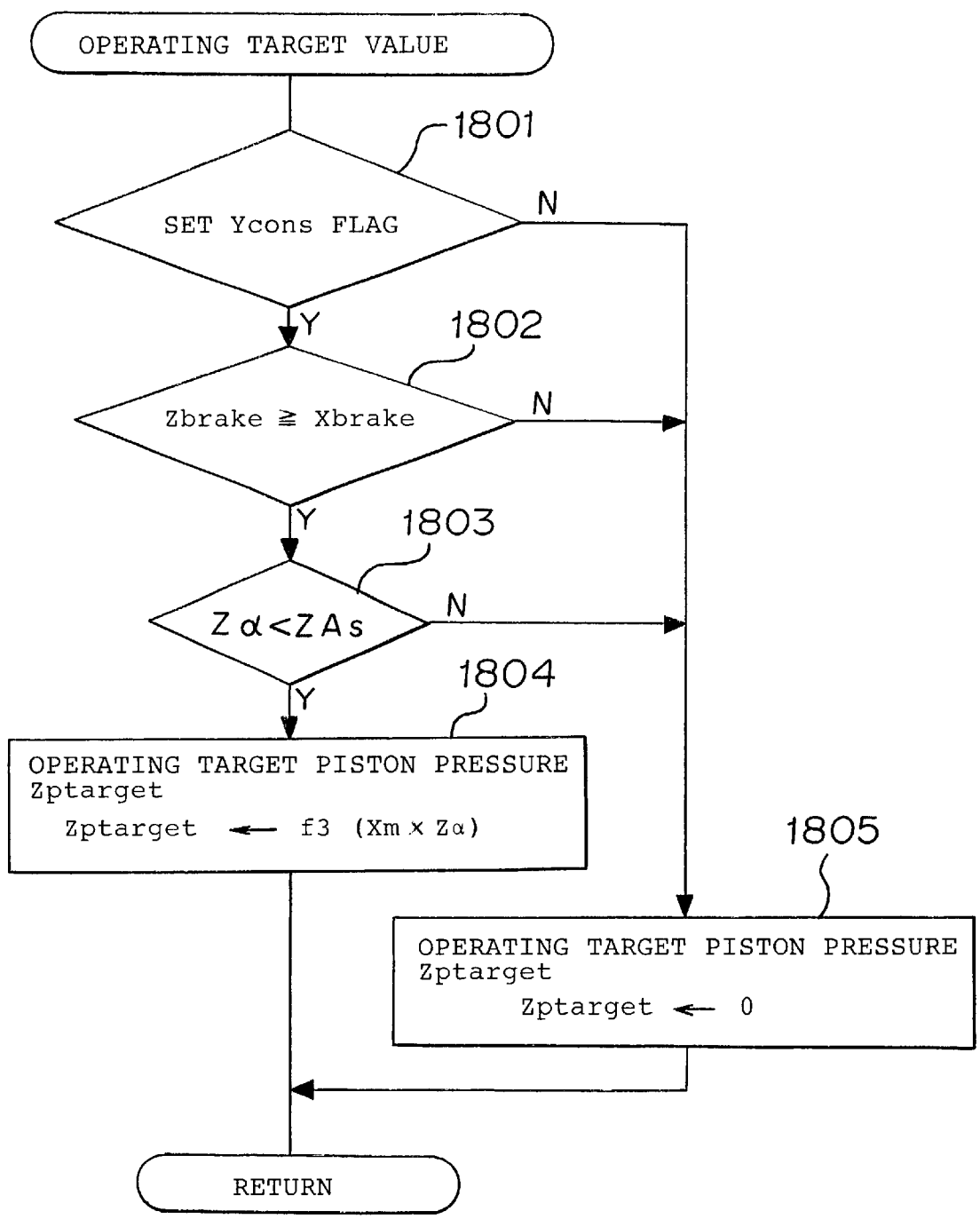
FIG. 24 is a flow chart illustrating a target value operating process according to Embodiment 9 of the present invention.

In the next, a target value operating process according to Embodiment 8 will be described in reference of a flow chart illustrated in FIG. 24.

(1) In Step 1801, it is judged whether or not a driver is unconscious by a Ycons flag, namely whether or not the Ycons flag is set.

(2) When the Ycons flag is set, Step 1802 is selected to judge whether or not the amount of stepping brake Zbrake is a predetermined value Xbrake or more, namely whether or not a brake pedal 101 is stepped.

(3) When $Zbrake \geq Xbrake$, Step 1803 is selected to judge whether or not an approach index $Z\alpha$, being equal to a target accelerating degree of own vehicle ZAtarget, is smaller than an accelerating degree of the own vehicle ZAs at that time, namely whether or not $Z\alpha<ZAs$.

Figure 25:
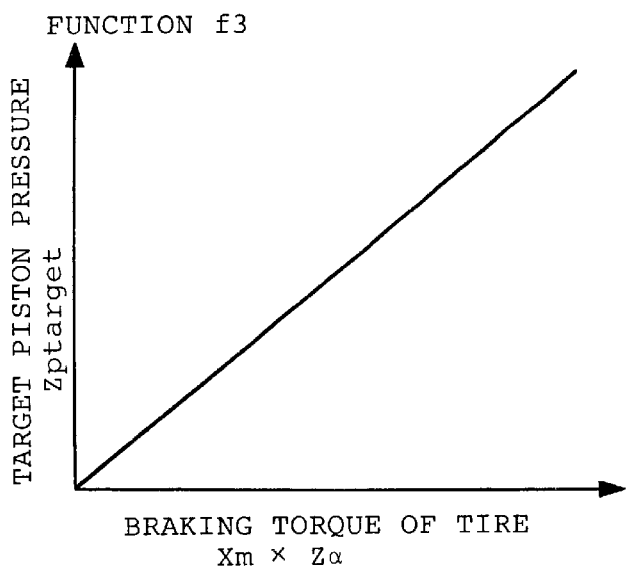
FIG. 25 is a graph showing a function f3 related to a characteristic of target piston pressure according to Embodiment 9 of the present invention.

(4) When $Z\alpha<ZAs$, Step 1804 is selected to operate a target piston pressure Zptarget by a function f3 illustrated in FIG. 25 based on a value obtained by multiplying the approach index, i.e. the target accelerating degree of the own vehicle ZAtarget, by a vehicle weight.

The value obtained by multiplying the target accelerating degree of the own vehicle ZAtarget by the vehicle weight corresponds to a braking force by tires. Therefore, according to the function f3, a target piston pressure giving a braking force by tires, by which the target accelerating degree ZAtarget can be outputted, is set.

(5) When the Ycons flag is not set; $Zbrake \geq Xbrake$ is not established; or $Z\alpha<ZAs$ is not established, Step 1805 is selected to set the target piston pressure Zptarget to be 0.

(6) After processing Steps 1801 through 1805, Step 206 in FIG. 2 is selected.

The dangerous approach prevention device according to Embodiment 9 operates a target accelerating degree of own vehicle for running with safe following-on ranges from forward obstacles or preceding vehicles based on a target following-on range, an accelerating degree of the own vehicle, an accelerating degree of the preceding vehicle, a relative velocity, and the following-on range, and thus obtained target accelerating degree is set to be the approach index $Z\alpha$. Further, a braking actuator of a pressurizing electromagnetic valve 112 and a depressurizing electromagnetic valve 120 is driven to realize a wheel cylinder pressure, by which the target accelerating degree of the own vehicle, i.e. the approach index $Z\alpha$, can be outputted.

According to this structure, in case that a driver is unconscious of a front of the own vehicle and simultaneously a following-on range after t seconds is smaller than a target following-on range, namely the own vehicle does not safely run with respect to a preceding vehicle, as long as the approach index $Z\alpha$, being equal to ZAtarget, is set to be $Z\alpha<ZAs$, a wheel cylinder pressure ordinarily determined to be unique by the amount of stepping brake is increased to be a wheel cylinder pressure, by which a target accelerating degree, being equal to the approach index $Z\alpha$, can be outputted by the function f3. As a result, a braking force of the own vehicle is enhanced.

Further, in case that a following-on range after t seconds is larger than a target following-on range, namely the own vehicle safely runs with respect to a preceding vehicle, as long as $Z\alpha \geq ZAs$, where $Z\alpha$ being equal to ZAtarget, a wheel cylinder pressure is uniquely determined by the amount of stepping brake and the wheel cylinder pressure corresponds to the amount of manipulating a brake pedal 101 by a driver. As a result, a relationship between a manipulation of brake and the wheel cylinder pressure is not changed from an ordinary driving and a manipulation by the driver is seemingly taken first priority.

Accordingly, it is possible to accurately obtain the approach index indicating a risk of colliding with forward obstacles or preceding vehicles. Therefore, a drive feeling by the driver is not spoiled and an excessive approach to and a collision with preceding vehicles can be avoided, whereby safety of vehicle can be enhanced.

Incidentally, in Embodiment 9, although the target piston pressure Zptarget is operated by multiplying the approach index, i.e. the target accelerating degree of the own vehicle ZAtarget, by the vehicle weight, the target piston pressure can be further corrected by information of conditions of roads, such as a gradient, a friction coefficient, and a radius of curve respectively of roads.

Embodiment 10

A structure of a dangerous approach prevention device according to Embodiment 10 is based on FIG. 15 described in Embodiment 2 and a program is based on Embodiment 2. The approach index operating process of Embodiment 2 is changed to a process illustrated in FIG. 23 described in Embodiment 9 and the target value operating process is changed to a process illustrated in FIG. 26.

References ZLtarget, ZdL, and ZAtarget are variables, which can temporarily memorize results of operation in a memory unit 118 and can be randomly read out the results. Reference Xm is data previously memorized in the memory unit 118 and can be read out. The approach index operating process illustrated in FIG. 23 is the same as that described in Embodiment 9.

Figure 26:
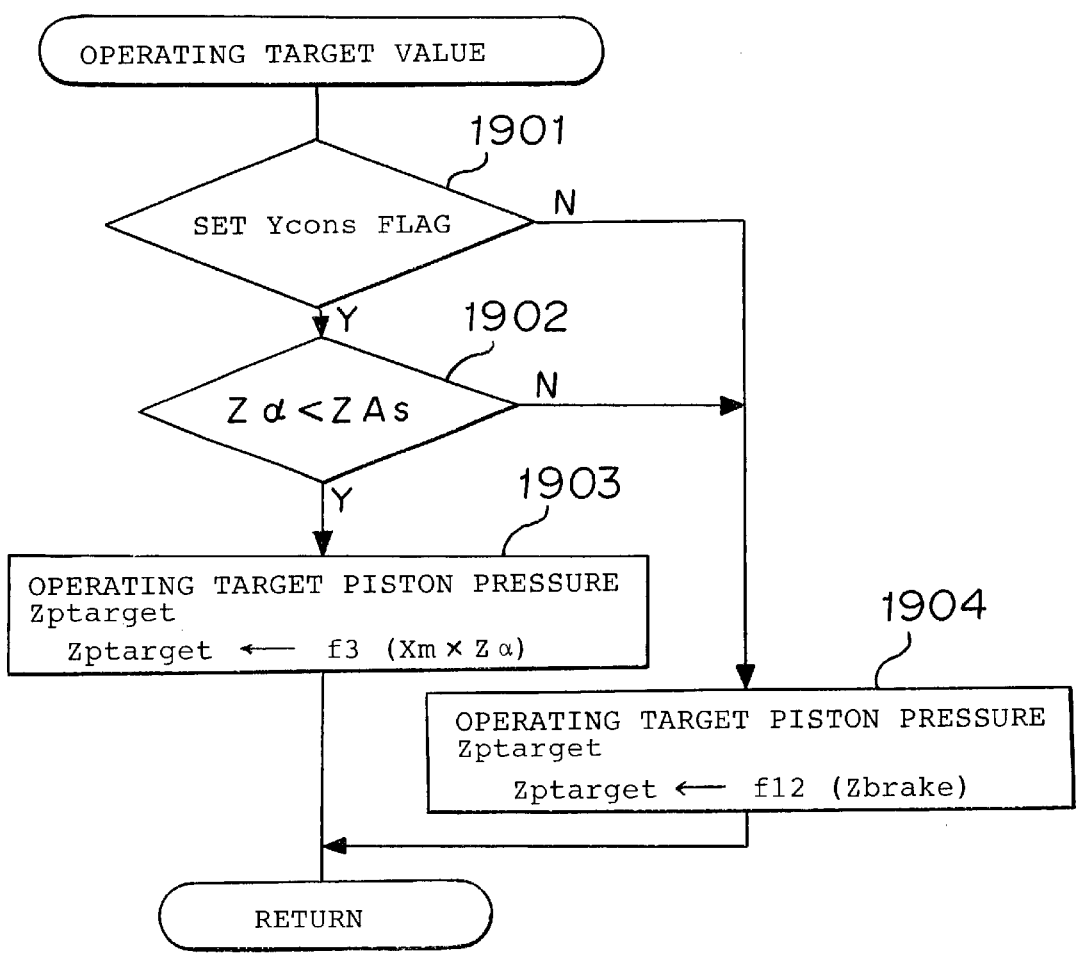
FIG. 26 is a flow chart illustrating a target value operating process according to Embodiment 10 of the present invention.

In the next, a target value operating process according to Embodiment 10 will be described using a flow chart illustrated in FIG. 26.

(1) In Step 1901, it is judged whether or not a driver is unconscious by a Ycons flag, namely whether or not the Ycons flag is set.

(2) When the Ycons flag is set, Step 1902 is selected to judge whether or not an approach index $Z\alpha$, being equal to a target accelerating and decelerating degree of own vehicle ZAtarget, is smaller than an accelerating and decelerating degree ZAs of the own vehicle at that time, namely whether or not $Z\alpha<ZAS$.

(3) When $Z\alpha<ZAs$, Step 1903 is selected to operate a target piston pressure Zptarget by a function f3 illustrated in FIG. 25 based on a value obtained by multiplying the approach index, i.e. the target accelerating and decelerating degree ZAtarget of the own vehicle, by a vehicle weight. The function f3 is as described in Embodiment 9.

(4) When the Ycons flag is not set or $Z\alpha<XAs$ is not established, Step 1904 is selected to operate the target piston pressure Zptarget by a function f12 as illustrated in FIG. 17 based on the amount of stepping brake Zbrake. The function f12 is as described in Embodiment 2.

(5) After processing Steps 1901 through 1904, Step 206 in FIG. 2 is selected.

According to this structure, effects similar to those in Embodiment 9 are demonstrated.

Although, in Embodiment 10, the target piston pressure Zptarget is operated based on the value obtained by multiplying the approach index, i.e. the target accelerating and decelerating degree ZAtarget of the own vehicle, by the vehicle weight, the target piston pressure may be corrected by conditions of roads such as gradients, friction coefficients, and radiuses of curve.

Embodiment 11

A structure and a program of a dangerous approach prevention device according to Embodiment 11 is based on Embodiments 1, 2, 7, and 8, wherein the process of operating accelerating degree of own vehicle is changed.

Figure 27:
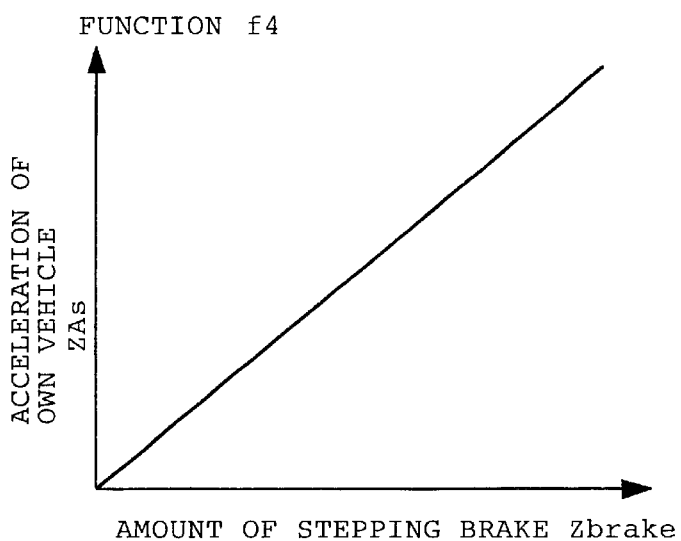
FIG. 27 is a graph showing a function f4 related to an amount of stepping a brake and a characteristic of accelerating an own vehicle according to Embodiment 11 of the present invention.

Although the process of operating accelerating degree of own vehicle is a means for memorizing a value obtained by once differentiating a velocity of own vehicle ZVs as an accelerating degree of own vehicle ZAs, a process of operating accelerating degree of own vehicle according to Embodiment 11 obtains an accelerating degree of own vehicle ZAs by a function f4 illustrated in FIG. 27 based on the amount of stepping brake Zbrake. According to the function f4, as the amount of stepping brake Zbrake is large, the accelerating degree ZAs of the own vehicle is set to be high.

According to the dangerous approach prevention device according to Embodiment 11, the accelerating degree of the own vehicle is operated based on the amount of stepping a brake pedal. According to this structure, an accelerating state of the own vehicle can be detected before a change of acceleration occurs by manipulating of the brake pedal by a driver, it is possible to increase a braking force of the own vehicle at a timing earlier than acceleration and deceleration of the own vehicle based on a vehicle velocity.

Although the means for operating accelerating degree of the own vehicle according to Embodiment 11 is to operate the accelerating degree ZAs of the own vehicle solely based on the amount of stepping the brake pedal Zbrake, the accelerating degree ZAs of the own vehicle can be further corrected by the number of revolution of an engine ZNe, whether or not a fuel supplied to the engine is cut, a transmission ratio ZRtrans, a velocity of the own vehicle ZVs, a vehicle weight Xm, the number of passengers, a gradient of road, a friction coefficient of road, and so on.

Embodiment 12

Figure 28:
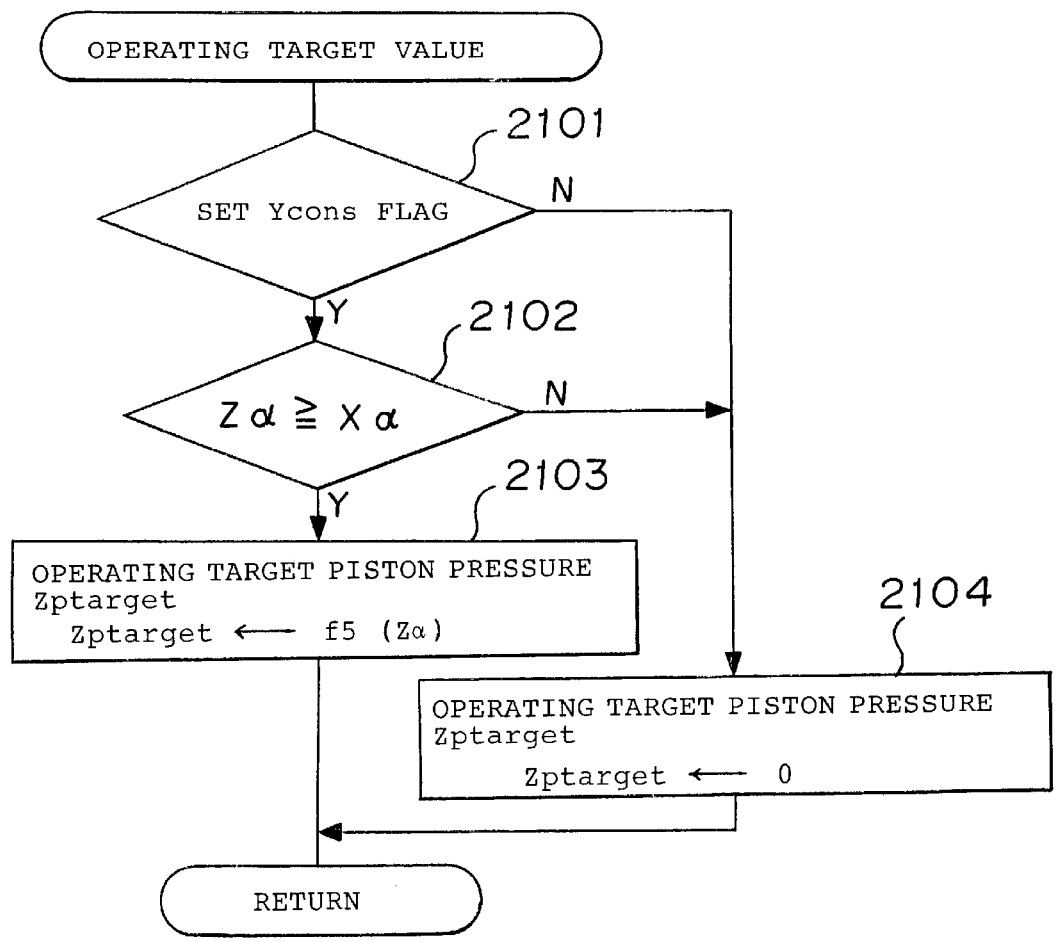
FIG. 28 is a flow chart illustrating a target value operating process according to Embodiment 12 of the present invention.

A structure of a dangerous approach prevention device according to Embodiment 12 is based on FIG. 1 described in Embodiment 1, wherein a program is based on Embodiment 1 and the target value operating process in Embodiment 1 is changed to a process illustrated in FIG. 28. A target value operating process according to Embodiment 12 will be described in reference of a flow chart illustrated in FIG. 28.

(1) In Step 2101, it is judged whether or not a driver is unconscious by a Ycons flag, namely whether or not the Ycons flag is set.

(2) When the Ycons flag is set, Step 2102 is selected to judge whether or not an approach index $z\alpha$ is a predetermined value $X\alpha$ or more, namely whether or not $Z\alpha \geq X\alpha$.

Figure 29:
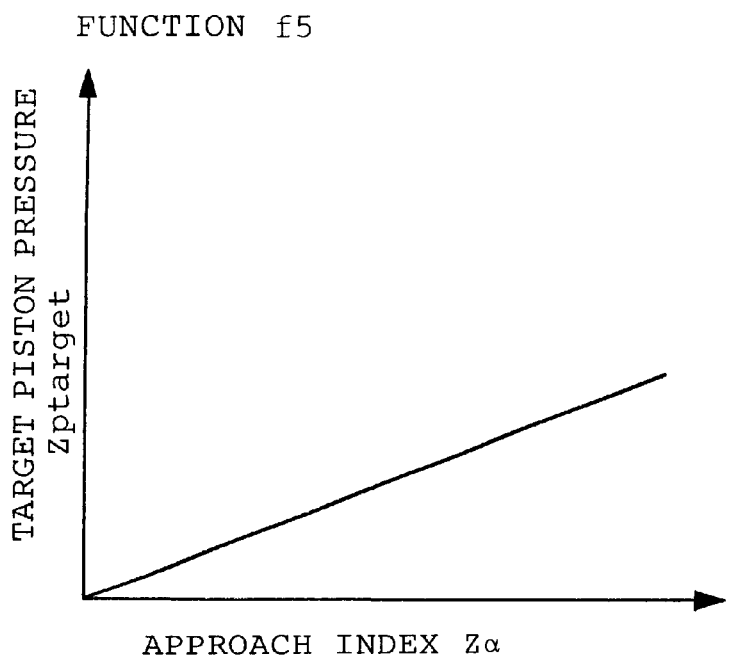
FIG. 29 is a graph showing a function f5 related to an approach index and a characteristic of target piston pressure according to Embodiment 12 of the present invention.

(3) When $Z\alpha \geq X\alpha$, Step 2103 is selected to operate a target piston pressure Zptarget by a function f5 illustrated in FIG. 29 based on the approach index $Z\alpha$. According to the function f5, the target piston pressure Zptarget is proportional to the approach index $Z\alpha$; and as a possibility of colliding with a preceding vehicle is high, the target piston pressure Zptarget is set to be large for generating a braking force.

(4) When the Ycons flag is not set, or $Z\alpha \geq X\alpha$ is not established, Step 2104 is selected to substitute 0 into the target piston pressure Zptarget. For example, in case that $Z\alpha=1/X{tmax}$, namely the own vehicle does not collide with a preceding vehicle, $X\alpha$ is set to be $Z\alpha<X\alpha$. By this, the target piston pressure is set to be 0; a piston is in an initial position on the right end in FIG. 1; and a wheel cylinder pressure corresponds to the amount of stepping a brake pedal 101 to generate a braking force.

(5) After processing Steps 2101 through 2104, Step 206 in FIG. 2 is selected.

In the dangerous approach prevention device according to Embodiment 12, in case that a driver is unconscious of a front of the own vehicle and the own vehicle does not safely run with respect to preceding vehicles, the target piston pressure is operated based on the approach index $Z\alpha$ in accordance with the function f5; and the wheel cylinder pressure corresponding to the target piston pressure for braking the own vehicle is automatically generated regardless of stepping of the brake pedal.

Further, when the own vehicle safely runs with respect to preceding vehicles, the wheel cylinder pressure is uniquely determined by the amount of stepping brake as in an ordinary driving regardless of whether or not the driver is unconscious, and therefore, a braking force is not automatically generated.

Accordingly, only in a case that the driver is unconscious of a front of the own vehicle, the brake is automatically applied, wherein the driver can feel in the body that there is a risk of colliding with the preceding vehicle and returns to his consciousness to a front of the own vehicle to avoid an excessive approach to and a collision with the preceding vehicle, whereby safety of vehicle is enhanced.

Figure 30:
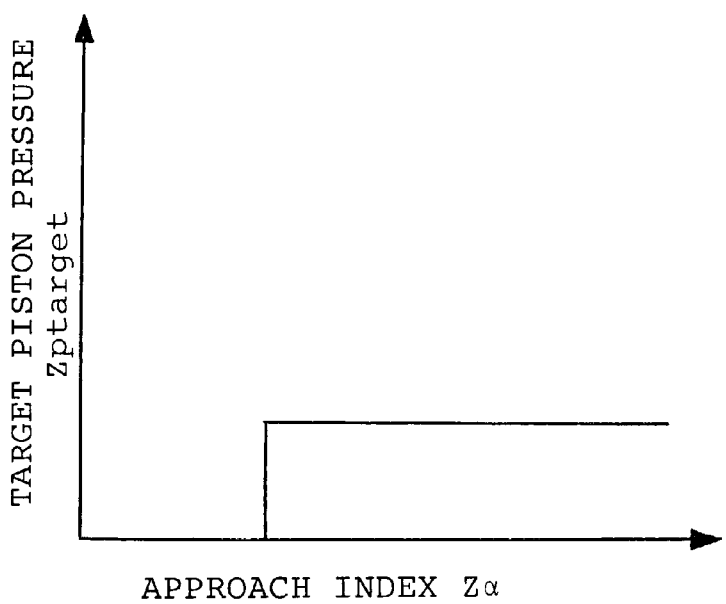
FIG. 30 is a graph showing the approach index and the characteristic of target piston pressure according to Embodiment 12 of the present invention.
Figure 31:
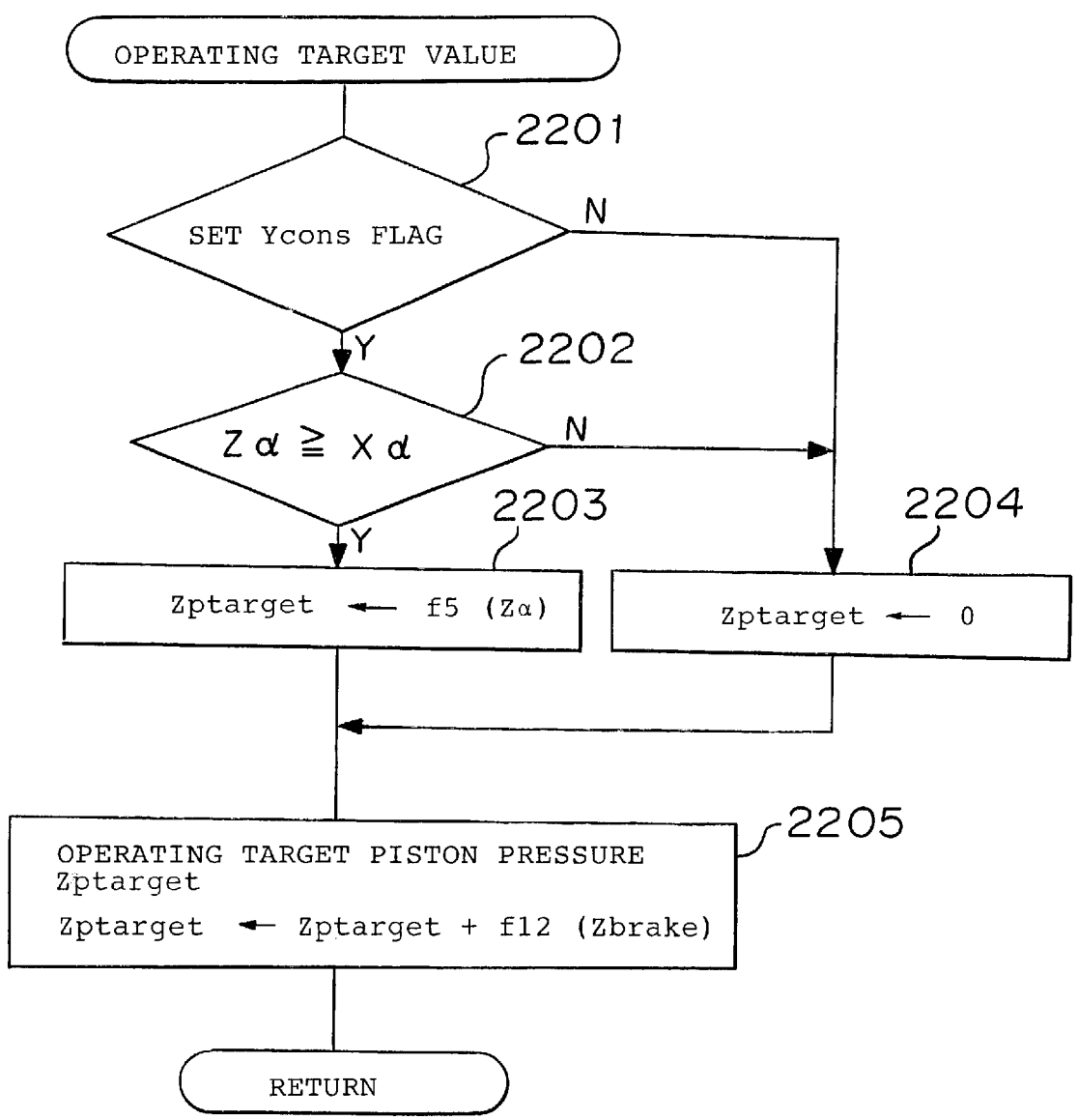
FIG. 31 is a flow chart illustrating a target value operating process according to Embodiment 13 of the present invention.

According to the dangerous approach prevention device according to Embodiment 12, although the target piston pressure Zptarget is changed based on the approach index $Z\alpha$ in Step 2103, effects similar to those described can be demonstrated by setting the target piston pressure Zptarget to be a predetermined value when the approach index is a predetermined value or more as illustrated in FIG. 30.

In this case, it is preferable that the predetermined value to be set in the target piston pressure Zptarget corresponds to a braking force sufficiently weak for making the driver feel in his body that the vehicle is decelerating.

Embodiment 13

A structure of a dangerous approach prevention device according to Embodiment 13 is based on FIG. 15 illustrated in Embodiment 2 and a program thereof is based on Embodiment 2. The target value operating process in Embodiment 2 is changed to a process illustrated in FIG. 31.

(1) In Step 2201, it is judged whether or not a driver is unconscious by a Ycons flag, namely whether or not the Ycons flag is set.

(2) When the Ycons flag is set, Step 2202 is selected to judge whether or not an approach index $Z\alpha$ is a predetermined value $X\alpha$ or more, namely whether or not $Z\alpha \geq X\alpha$.

(3) When $Z\alpha \geq X\alpha$, Step 2203 is selected to operate a target piston pressure Zptarget by a function f5 illustrated in FIG. 29 based on the approach index $Z\alpha$. The function f5 is as described in Embodiment 12.

(4) When the Ycons flag is not set, namely $Z\alpha \geq X\alpha$ is not established, Step 2204 is selected to substitute 0 into the target piston pressure Zptarget.

(5) In Step 2205, a pressure based on the amount of stepping brake Zbrake is added to the target piston pressure Zptarget set in Step 2203 or 2204 in accordance with a function f12 illustrated in FIG. 17 and described in Embodiment 2.

(6) After processing Steps 2201 through 2204, Step 206 in FIG. 2 is selected.

The dangerous approach prevention device according to Embodiment 13 automatically generates a wheel cylinder pressure corresponding to the target piston pressure, i.e. a braking force of vehicle, regardless of stepping of a brake pedal because the target piston pressure based on the approach index $Z\alpha$ is operated in accordance with the function f5 when the driver is unconscious of a front of an own vehicle and the own vehicle does not safely run with respect to a preceding vehicle.

Further, when the own vehicle safely runs with respect to a preceding vehicle, the wheel cylinder pressure is uniquely determined by the amount of stepping brake as in an ordinary driving regardless of the unconsciousness the driver, whereby the braking force is not automatically generated.

Therefore, only in a case that the driver is unconscious of the front of the own vehicle, the brake is automatically applied, wherein a driver can feel in his body that there is a danger of colliding with a preceding vehicle is increasing to return to his consciousness of the front of the own vehicle, and therefor an excessive approach to and a collision with the preceding vehicle can be avoided, whereby safety of the own vehicle can be enhanced.

Although the dangerous approach prevention device according to Embodiment 13 changes the target piston pressure Zptarget based on the approach index $Z\alpha$ in Step 2203, effects similar thereto are demonstrated by setting the target piston pressure Zptarget to be a predetermined constant value when the approach index is a predetermined value or more as illustrated in FIG. 30.

In this case, it is appropriate that the predetermined value set in the target piston pressure Zptarget is a value corresponding to a sufficiently weak braking force for making the driver feel in his body that the vehicle is decelerating.

Embodiment 14

A structure and a program of a dangerous approach prevention device according to Embodiment 14 is based on the above-mentioned Embodiments, wherein the relative velocity operating process in these Embodiments is changed. Although the above-mentioned relative velocity operating process is attained by the means for memorizing a value obtained by once differentiating the following-on range ZL as the relative velocity ZVr, the relative velocity operating process according to Embodiment 14 is to obtain a relative velocity by a sensor provided to detect relative velocities or simultaneously detect following-on ranges and the relative velocities.

According to this structure, not only that an accurate relative velocity is obtainable in comparison with a means of operating relative velocities based on following-on ranges but also more practical accelerating. degrees of preceding vehicles are obtainable, whereby a more accurate approach index is obtainable, wherein excessive approaches to and collisions with preceding vehicles can be avoided without deteriorating a drive feeling by a driver. Thus, safety of vehicle can be enhanced.

Although in Embodiments 1 through 14, preceding vehicles are exemplified, obstacles are included in these. Needless to say that the present invention is applicable to obstacles existing in a front of an own vehicle.

The invention provides effects that excessive approaches to and collisions with preceding vehicles and obstacles can be avoided only in case that a driver is unconscious of a front of an own vehicle; and in an ordinary driving, a drive feeling by the driver is not spoiled, since a dangerous approach prevention device according to the invention detects states that the driver is unconscious of the front in driving the own vehicle by dozing, looking aside, changing lanes and so on, controls a braking force of the own vehicle in response to thus detected states and degrees of approaching to the preceding vehicles, further detects that the driver is consciously driving at a time of accelerating, and controls the own vehicle by an ordinary braking force by judging that the driver is not unconscious when the driver intentionally accelerates or safely drives as in an ordinary driving, wherein safety of vehicle can be enhanced.

Obviously, numerous modifications and variations of the present invention are possible in light of the above teachings. It is therefore to be understood that within the scope of the appended claims, the invention may be practiced otherwise than as specifically described herein.

What is claimed is:

1. A dangerous approach prevention device which prevents a vehicle from being in a dangerous situation in approaching to a preceding vehicle, comprising:

an unconsciousness judging means for detecting a state of a driver of the vehicle, an intention of accelerating the vehicle by the driver and an intention of changing a driving lane of the vehicle by the driver, and judging whether the driver is unconscious based on the detected state of the driver, a time after the intention of accelerating the vehicle by the driver is detected minus a predetermined time, and a time after the intention of changing the driving lane of the vehicle by the driver is detected minus a predetermined time; and a means for adjusting a braking force of the vehicle in response to a degree of approaching to the preceding vehicle when the driver is unconscious and applying a braking force corresponding to an ordinary amount of braking force when the driver is not unconscious, wherein the degree of approaching to the preceding vehicle is determined based on at least one of an accelerating degree of the vehicle and an accelerating degree of the preceding vehicle.

2. The dangerous approach prevention device according to claim 1, wherein the degree of approaching to the preceding vehicle is an approach index indicating a level of dangerous approach to the preceding vehicle, which is obtained based on data including a target following-on range, the accelerating degree of the vehicle, the acceleration of the preceding vehicle, relative velocity and a following-on range.

3. The dangerous approach prevention device according to claim 2, wherein said approach index is a time for colliding with the preceding vehicle, a target acceleration of the vehicle for running with a safe following-on range from the preceding vehicle, or a result of comparison acquired between said target acceleration of the vehicle for running with a safe following-on range from the preceding vehicle and said accelerating degree of the vehicle.

4. The dangerous approach prevention device according to claim 2, wherein said accelerating degree of the vehicle is an accelerating degree introduced based on a velocity of the vehicle or that corresponding to the amount of stepping a brake.

5. The dangerous approach prevention device according to claim 3, wherein said accelerating degree of the vehicle is an accelerating degree introduced based on a velocity of the vehicle or that corresponding to the amount of stepping a brake.

6. The dangerous approach prevention device according to claim 2, wherein
   said relative velocity is a relative velocity introduced based on the following-on range or that detected by a relative velocity sensor.

7. The dangerous approach prevention device according to claim 3, wherein
   said relative velocity is a relative velocity introduced based on the following-on range or that detected by a relative velocity sensor.

8. The dangerous approach prevention device according to claim 1, wherein
   when the driver is unconscious, said braking force adjusting means adjusts a braking force in response to a target braking force introduced based on said degree of approaching to the preceding vehicle, adjusts the braking force in response to a target braking force introduced based on the amount of stepping a brake pedal and said degree of approaching to the preceding vehicles, or adjusts the braking force by a constant target braking force based on said degree of approaching to the preceding vehicles.

9. The dangerous approach prevention device according to claim 2, wherein
   when the driver is unconscious, said braking force adjusting means adjusts a braking force in response to a target braking force introduced based on said degree of approaching to the preceding vehicle, adjusts the braking force in response to a target braking force introduced based on the amount of stepping a brake pedal and said degree of approaching to the preceding vehicles, or adjusts the braking force by a constant target braking force based on said degree of approaching to the preceding vehicles.

10. The dangerous approach prevention device according to claim 1, wherein said unconsciousness judging means is a dozing detecting means for judging that the driver is unconscious when a dozing of the driver is detected, a looking-aside detecting means for judging that the driver is unconscious when a looking-aside of the driver is detected, or a lane changing intention detecting means for detecting an intention of changing lanes by the driver and judging that the driver is unconscious in response to this intention, or a means composed of a plurality of said three means arbitrarily selected and a means for judging unconsciousness by an AND or OR condition of the driver unconscious judgments by the plurality of said three means.

11. The dangerous approach prevention device according to claim 2, wherein said unconsciousness judging means is a dozing detecting means for judging that the driver is unconscious when a dozing of the driver is detected, a looking-aside detecting means for judging that the driver is unconscious when a looking-aside of the driver is detected, or a lane changing intention detecting means for detecting an intention of changing lanes by the driver and judging that the driver is unconscious in response to this intention; or a means composed of a plurality of said three means arbitrarily selected and a means for judging unconsciousness by an AND or OR condition of the driver unconscious judgments by the plurality of said three means.

12. The dangerous approach prevention device according to claim 1, further comprising:

a consciousness judging means for detecting an intention of accelerating by the driver working as an accelerating intention detecting means for judging that the driver is not unconscious in response to the intention of accelerating by the driver, wherein said braking force adjusting means controls with an ordinary braking force in response to the judgement that the driver is not unconscious.

13. The dangerous approach prevention device according to claim 2, further comprising:

a consciousness judging means for detecting an intention of accelerating by the driver working as an accelerating intention detecting means for judging that the driver is not unconscious in response to the intention of accelerating by the driver, wherein said braking force adjusting means controls with an ordinary braking force in response to the judgement that the driver is not unconscious.

14. The dangerous approach prevention device according to claim 10, wherein said dozing detecting means is a means for detecting the dozing of the driver based on a steering angle, a variable amount of the steering angle, or a frequency of changing the steering angle.

15. The dangerous approach prevention device according to claim 10, wherein said dozing detecting means is a means for detecting the dozing based on a directional change of the vehicle by a gyro sensor, a means for detecting the dozing based on an accelerating degree in a lateral direction of the own vehicle, or a means for detecting the dozing based on a position in a lateral direction in a lane where the own vehicle travels.

16. The dangerous approach prevention device according to claim 10, wherein said dozing detecting means or said looking-aside detecting means detects the dozing of the driver based on a face image of the driver shot by a camera.

17. The dangerous approach prevention device according to claim 10, wherein said dozing detecting means or said lane changing intention detecting means operates a radius or a curvature each of a road based on a shape of a lane and a radius or a curvature each of a lane where the vehicle travels based on a velocity and a steering angle of the vehicle, and detects the dozing or the intention of changing lanes in response to a comparison between results of these operations.

18. The dangerous approach prevention device according to claim 10, wherein said lane changing intention detecting means is a means for judging the intention of changing lanes in response to a steering angle, a variable amount of the steering angle, or a frequency of changing the steering angle each manipulated by a driver, or a means for judging that the driver has the intention of changing lanes in response to a lateral position of the vehicle with respect to positions of lanes.

19. The dangerous approach prevention device according to claim 10, wherein said lane changing intention detecting means judges that the driver has the intention of changing lanes when a turn indicator light indicates a direction of the vehicle.

20. The dangerous approach prevention device according to claim 12, wherein said accelerating intention detecting means is a means for judging the intention of accelerating based on the amount of stepping an accelerator pedal, a variable amount of stepping the accelerator pedal, or a frequency of changing a stepping of the accelerator pedal or a means for judging that the driver has the intention of accelerating in response to a gear change of a transmission to lower gears and the stepping of the accelerator pedal.

* * * * *